United States Patent
Shih et al.

(10) Patent No.: US 11,632,699 B2
(45) Date of Patent: *Apr. 18, 2023

(54) METHODS AND APPARATUSES FOR PERFORMING CELL (RE)SELECTION IN NON-PUBLIC NETWORK

(71) Applicant: FG Innovation Company Limited, Tuen Mun (HK)

(72) Inventors: Mei-Ju Shih, Taipei (TW); Hung-Chen Chen, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,224

(22) Filed: Dec. 23, 2021

(65) Prior Publication Data

US 2022/0116835 A1 Apr. 14, 2022

Related U.S. Application Data

(63) Continuation of application No. 17/033,063, filed on Sep. 25, 2020, now Pat. No. 11,246,067.

(60) Provisional application No. 62/906,219, filed on Sep. 26, 2019.

(51) Int. Cl.
*H04W 36/00* (2009.01)
*H04W 48/10* (2009.01)
*H04W 60/00* (2009.01)
*H04W 48/18* (2009.01)

(52) U.S. Cl.
CPC ....... *H04W 36/0061* (2013.01); *H04W 48/10* (2013.01); *H04W 48/18* (2013.01); *H04W 60/00* (2013.01)

(58) Field of Classification Search
CPC . H04W 36/0061; H04W 48/10; H04W 48/18; H04W 60/00; H04W 48/12; H04W 84/16; H04W 36/08; H04W 36/165
See application file for complete search history.

(56) References Cited

U.S. PATENT DOCUMENTS

2020/0314731 A1\* 10/2020 Ryu .................... H04W 64/003
2022/0201482 A1\* 6/2022 Ferdi .................... H04W 60/00
2022/0201592 A1\* 6/2022 Lindheimer .......... H04W 48/18

OTHER PUBLICATIONS

China Telecom, "On Private Network Support for NG-RAN," 3GPP TSG RAN WG3 #105 R3-193832, (Aug. 16, 2019).

(Continued)

*Primary Examiner* — Marisol Figueroa
(74) *Attorney, Agent, or Firm* — ScienBiziP, P.C.

(57) ABSTRACT

A method performed by a BS for cell selection or reselection is provided. The method includes transmitting, to a UE, allowed NPN information that is in a form of a CAG ID list or in a form of an SNPN ID list; and transmitting, to the UE, NPN information and area information associated with the NPN information via a SIB1, the NPN information including an NPN ID list. In a case that the allowed NPN information is in the form of the CAG ID list, the allowed NPN information enables the UE to perform a first procedure. In a case that the allowed NPN information is in the form of the SNPN ID list, the allowed NPN information enables the UE to perform a second procedure. ABS using the method is also provided.

20 Claims, 6 Drawing Sheets

(56) References Cited

OTHER PUBLICATIONS

CMCC, "Consideration on standalone NPN," 3GPP TSG RAN WG2 #107 R2-1909470, (Aug. 16, 2019).
Nokia, Nokia Shanghai Bell, "Adding NIDs and CAG Identifiers to SIB," 3GPP TSG RAN WG2 #107 R2-1909308, (Aug. 16, 2019).
ZTE Corporation, Sanechips, "Consideration on the System Information of the Private Network," 3GPP TSG RAN WG2#107 R2-1909267, (Aug. 16, 2019).
Huawei, HiSilicon, "PLMN and cell selection for NPN," 3GPP TSG RAN WG2 #107 R2-1911054, (Aug. 16, 2019).

* cited by examiner

METHODS AND APPARATUSES FOR PERFORMING CELL (RE)SELECTION IN NON-PUBLIC NETWORK

CROSS-REFERENCE TO RELATED APPLICATION(S)

The present disclosure is a continuation application of U.S. patent application Ser. No. 17/033,063, filed on Sep. 25, 2020, which claims the benefit of and priority to U.S. Provisional Patent Application Ser. No. 62/906,219, filed on Sep. 26, 2019, the contents of all of which are hereby fully incorporated herein by reference for all purposes.

FIELD

The present disclosure generally relates to wireless communications, and more particularly, to methods and apparatuses for cell (re)selection in a Non-Public Network (NPN).

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to methods and apparatuses for performing cell (re)selection in an NPN.

According to a first aspect of the present disclosure, a method performed by a User Equipment (UE) for cell selection or reselection is provided. The method includes the UE storing allowed Non-Public Network (NPN) information that is in a form of a Cell Access Group (CAG) Identity (ID) list or in a form of a Stand-alone Non-Public Network (SNPN) ID list, receiving NPN information and area information associated with the NPN information via a System Information Block (SIB) Type 1 (SIB1) broadcast by a cell, the NPN information including an NPN ID list, performing a first procedure according to the allowed NPN information when the allowed NPN information is in the form of the CAG ID list, and performing a second procedure according to the allowed NPN information when the allowed NPN information is in the form of the SNPN ID list. The first procedure includes selecting a Public Land Mobile Network (PLMN) to register and selecting the cell to camp on after determining that a first NPN ID in the NPN ID list includes a first PLMN ID and a CAG ID, the first PLMN ID identifying the PLMN, the CAG ID belonging to the CAG ID list, the CAG ID associated with a CAG belonging to the PLMN. The second procedure includes selecting the cell to camp on after determining that a second NPN ID in the NPN ID list includes a second PLMN ID and a Network ID (NID), the second PLMN ID and the NID belonging to the SNPN ID list.

According to a second aspect of the present disclosure, a UE is provided. The UE includes a memory and at least one processor coupled to the memory. The at least one processor is provided to store allowed NPN information that is in a form of a CAG ID list or in a form of a SNPN ID list, receive NPN information and area information associated with the NPN information via a SIB1 broadcast by a cell, the NPN information including an NPN ID list, perform a first procedure according to the allowed NPN information when the allowed NPN information is in the form of the CAG ID list, and perform a second procedure according to the allowed NPN information when the allowed NPN information is in the form of the SNPN ID list. The first procedure includes selecting a PLMN to register and selecting the cell to camp on after determining that a first NPN ID in the NPN ID list includes a first PLMN ID and a CAG ID, the first PLMN ID identifying the PLMN, the CAG ID belonging to the CAG ID list, the CAG ID associated with a CAG belonging to the PLMN. The second procedure includes selecting the cell to camp on after determining that a second NPN ID in the NPN ID list includes a second PLMN ID and a NID, the second PLMN ID and the NID belonging to the SNPN ID list.

According to a third aspect of the present disclosure, a method performed by a BS for cell selection or reselection is provided. The method includes transmitting, to a UE, allowed NPN information that is in a form of a CAG ID list or in a form of a SNPN ID list; and transmitting, to the UE, NPN information and area information associated with the NPN information via a SIB1, the NPN information comprising an NPN ID list, wherein: in a case that the allowed NPN information is in the form of the CAG ID list, the allowed NPN information enables the UE to perform a first procedure; in a case that the allowed NPN information is in the form of the SNPN ID list, the allowed NPN information enables the UE to perform a second procedure. The first procedure includes: selecting a PLMN to register; and selecting a cell to camp on after determining that a first NPN ID in the NPN ID list comprises a first PLMN ID and a CAG ID, the first PLMN ID identifying the PLMN, the CAG ID belonging to the CAG ID list, the CAG ID associated with a CAG belonging to the PLMN. The second procedure includes: selecting the cell to camp on after determining that a second NPN ID in the NPN ID list comprises a second PLMN ID and a NID, the second PLMN ID and the NID belonging to the SNPN ID list.

In some implementations of the third aspect of the present disclosure, the area information includes at least one of a Tracking Area Code (TAC), a cell ID, and a Radio Access Network Area Code (RANAC).

In some implementations of the third aspect of the present disclosure, a maximum number of NPN IDs in the NPN ID list is configured by the cell as 12.

In some implementations of the third aspect of the present disclosure, the first NPN ID indicates a Public Network Integrated NPN (PNI-NPN) deployed with support of the PLMN.

In some implementations of the third aspect of the present disclosure, the second NPN ID indicates an SNPN.

In some implementations of the third aspect of the present disclosure, the first procedure further includes filtering out all NPN IDs excluding the first PLMN ID from the NPN ID list; and selecting an NPN ID that includes the CAG ID belonging to the CAG ID list from a remaining portion of the NPN ID list as the first NPN ID.

In some implementations of the third aspect of the present disclosure, each SNPN ID in the SNPN ID list comprises a PLMN ID portion and an NID portion.

In some implementations of the third aspect of the present disclosure, the second PLMN ID in the second NPN ID matches the PLMN ID portion of an SNPN ID in the SNPN ID list; and the NID in the second NPN ID matches the NID portion of the SNPN ID in the SNPN ID list.

In some implementations of the third aspect of the present disclosure, the area information comprises first area information and second area information, the first area information is associated with the first NPN ID, and the second area information is associated with the second NPN ID.

In some implementations of the third aspect of the present disclosure, the second procedure further includes filtering out all NPN IDs excluding the second PLMN ID and the NID from the NPN ID list; and selecting an NPN ID that includes the second PLMN ID and the NID from a remaining portion of the NPN ID list as the second NPN ID.

According to a fourth aspect of the present disclosure, a BS is provided. The BS includes at least one memory storing a set of instructions and at least one processor coupled to the at least one memory. The at least one processor is configured to execute the set of instructions to transmit, to a UE, allowed NPN information that is in a form of a CAG ID list or in a form of a SNPN ID list; and transmit, to the UE, NPN information and area information associated with the NPN information via a SIB1, the NPN information comprising an NPN ID list, wherein: in a case that the allowed NPN information is in the form of the CAG ID list, the allowed NPN information enables the UE to perform a first procedure; in a case that the allowed NPN information is in the form of the SNPN ID list, the allowed NPN information enables the UE to perform a second procedure. The first procedure includes: selecting a PLMN to register; and selecting a cell to camp on after determining that a first NPN ID in the NPN ID list comprises a first PLMN ID and a CAG ID, the first PLMN ID identifying the PLMN, the CAG ID belonging to the CAG ID list, the CAG ID associated with a CAG belonging to the PLMN. The second procedure includes: selecting the cell to camp on after determining that a second NPN ID in the NPN ID list comprises a second PLMN ID and a NID, the second PLMN ID and the NID belonging to the SNPN ID list.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
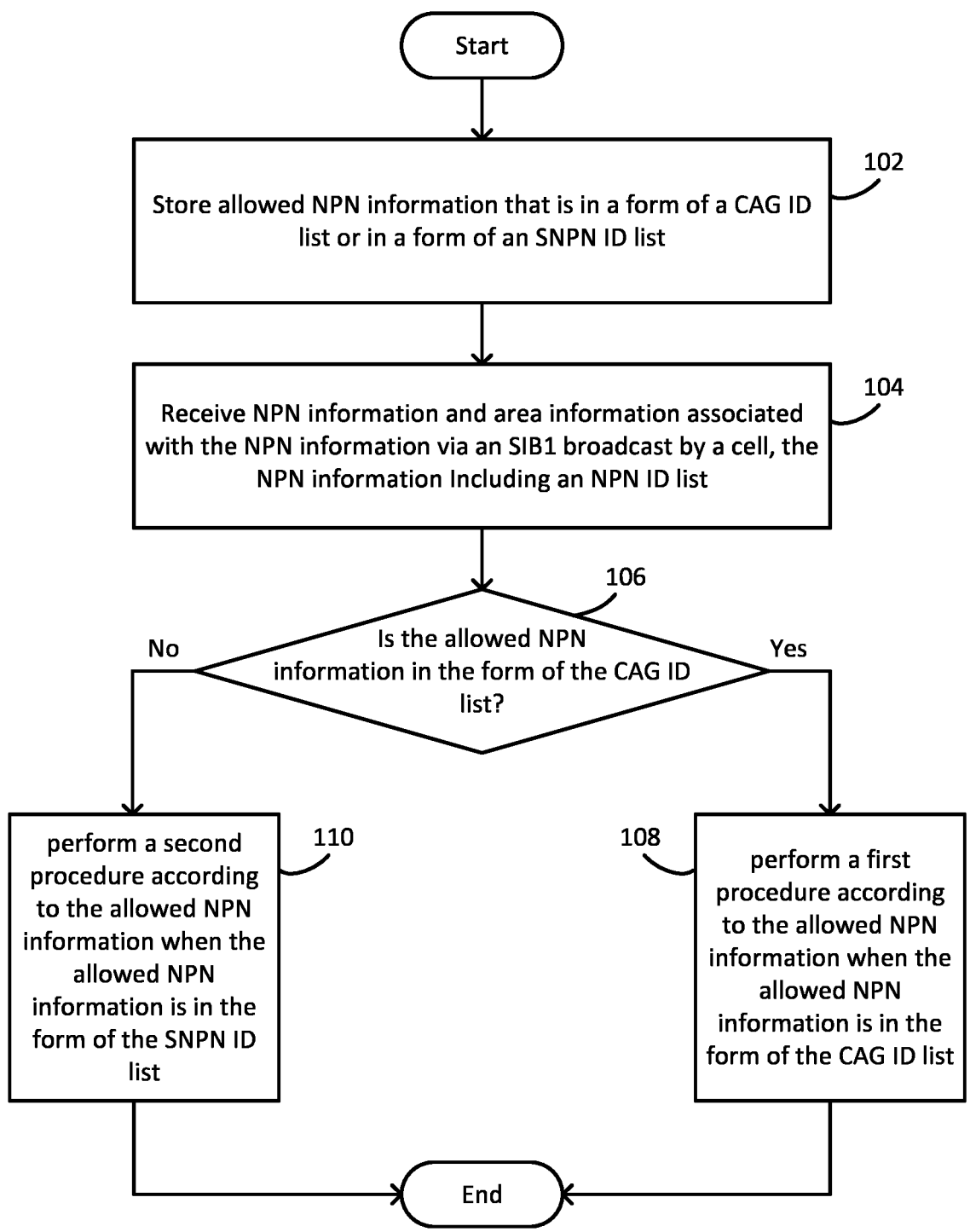
FIG. 1 illustrates a flowchart for a method for cell (re)selection, in accordance with an implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. Besides, the terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, a detailed description of well-known methods, technologies, systems, architectures, and the like are omitted so as not to obscure the description with unnecessary details.

Persons skilled in the art will immediately recognize that any network function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example disclosed implementations are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be provided to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be provided to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

For the RAT deployed on the unlicensed spectrum, any devices (e.g., UE, BS, and Access Point (AP)) should follow the Listen Before Talk (LBT) mechanism before accessing the channel. The device(s) may perform Clear Channel Assessment (CCA) before transmitting on the unlicensed channel. If LBT fails, the device(s) may not access the channel at a determined time.

NR-based Unlicensed access (NR-U) design also needs to consider the LBT mechanism. The deployment scenarios of NR-U may include:

- Carrier aggregation between licensed band NR (PCell) and NR-U (SCell),
  - NR-U SCell may have both DL and UL, or DL-only;
- Dual connectivity between licensed band LTE (PCell) and NR-U (PSCell);
- Stand-alone NR-U;
- An NR cell with DL in an unlicensed band and UL in a licensed band; and
- Dual connectivity between licensed band NR (PCell) and NR-U (PSCell).

In the next-generation cellular network, it is assumed that there may be multiple PLMN(s) and/or NPN(s) operating on one frequency. Furthermore, unlicensed RAT (e.g., stand-alone NR-U) is introduced, meaning that multiple PLMNs and/or NPNs may operate their cells on the same unlicensed spectrum. Thus, the cell (re)selection on the unlicensed spectrum should be further investigated, especially considering the uncertainty of channel load and channel sharing among multiple PLMNs and/or NPNs.

The UE may be enabled to camp on a non-best cell on an unlicensed carrier if the best cell does not belong to the registered PLMN (R-PLMN) (or Equivalent PLMN (E-PLMN)), where the non-best cell may still be the best cell of the R-PLMN. However, how it is achieved and whether any additional conditions are required should be for further study.

If the UE follows the legacy PLMN selection and cell (re)selection mechanism on the unlicensed spectrum for the RAN sharing scenarios and/or NPN scenarios, the UE may waste time and consume extra power (e.g., for detection and measurement) since the best cell on the unlicensed carrier may not belong to the selected (or equivalent) PLMN and/or NPN. In view of this, a cell (re)selection procedure performed based on the White List(s) is provided.

Multiple PLMNs/NPNs may operate on the unlicensed spectrum. Multiple PLMNs/NPNs may share the same unlicensed carrier. The PLMNs may be public or private. Public PLMNs may be (but not limited to) provided by the operators or virtual operators that provide radio services to the public subscribers. Public PLMNs may own the licensed spectrum and support the RAT on the licensed spectrum as well. Private PLMNs may be (but not limited to) provided by the micro-operators, factories, or enterprises that provide radio services to their private users (e.g., employees or machines). In one implementation, public PLMNs may support more deployment scenarios (e.g., carrier aggregation between licensed band NR (as a PCell) and NR-U (as an SCell), dual connectivity between licensed band LTE (as a PCell) and NR-U (as a PSCell), stand-alone NR-U, an NR cell with DL in an unlicensed band and UL in a licensed band, dual connectivity between licensed band NR (as a PCell) and NR-U (as a PSCell)). In one implementation, private PLMNs may mainly support (but not limited to) the stand-alone unlicensed RAT (e.g., stand-alone NR-U). The NPN may be an SNPN, a PNI-NPN or be implemented by a PLMN with a private slice. An SNPN may be operated by an NPN operator and may not rely on network functions provided by a PLMN. A PNI-NPN may be deployed with the support of a PLMN. The NPN may be deployed on the licensed band or unlicensed band. The NPN may support different deployment scenarios (e.g., carrier aggregation between licensed band NR (as a PCell) and NR-U (as an SCell), dual connectivity between licensed band LTE (as a PCell) and NR-U (as a PSCell), stand-alone NR-U, an NR cell with DL in an unlicensed band and UL in a licensed band, dual connectivity between licensed band NR (as a PCell) and NR-U (as a PSCell)).

NR-U Cell (Re)Selection

In unlicensed bands, multiple PLMNs/NPNs may use the same carrier(s) without any coordination. Therefore, the best cell found by a UE on a frequency may not belong to the R-PLMN. In this case, the UE may need to camp on a non-best cell on a carrier if the best cell does not belong to the R-PLMN (or E-PLMN), where the non-best cell may still be the best cell of the R-PLMN.

A Radio Resource Control (RRC)_IDLE UE (e.g., a UE operating in an RRC_IDLE state) or an RRC_INACTIVE UE (e.g., a UE operating in an RRC_INACTIVE state) may or may not perform Received Signal Strength Indicator (RSSI) measurements. An RRC_IDLE or RRC_INACTIVE UE may or may not perform Channel Occupancy (CO) measurements. An RRC_IDLE or RRC_INACTIVE UE may perform cell (re)selection based on the RSSI and/or CO measurement result.

If the highest-ranked or best cell is not suitable in an unlicensed frequency since the associated PLMN ID does not belong to the R-PLMN (or E-PLMN), (only) the highest-ranked or best cell may be considered as a non-candidate cell for cell reselection for 300 seconds or longer. Other cells in the unlicensed frequency may still be considered as candidate cells for cell reselection.

On NR-U frequencies, if the highest-ranked cell or best cell is not suitable due to belonging to a PLMN that is not indicated as being equivalent to the R-PLMN, the UE may not consider this cell for a maximum of 300 seconds for cell reselection. Still, the UE may consider the other cells as candidate cells for cell reselection on the same frequency. The UE may consider an NR-U frequency to be the lowest priority frequency for cell reselection for 300 seconds after at least a certain condition (e.g., N cells) on the NR-U frequency were found not suitable due to belonging to a PLMN that is not indicated as being equivalent to the R-PLMN.

Utilize White List for Cell (Re)Selection

The concept of White List(s) may be used for an RRC_IDLE or RRC_INACTIVE UE to perform cell (re) selection. The cell may transmit the White List(s) to the UE(s) via system information or dedicated signaling. The cell may indicate to the UE the information to be modified in, added to, or removed from the White List(s). The information may include at least one of the cell information, the area information, the PLMN information, the NPN information, and the frequency information. In one implementation, the cell may indicate the validity of the White List(s) to the UE (e.g., the White List(s) may be by default valid if the cell does not provide any validation indication). The UE may perform measurements on (neighboring) cells based on the information included in the White List(s) (e.g., while the White List(s) are valid). For example, if the cell(s) indicated by the White List(s) belongs to the allowed PLMN(s) of the UE, the White List(s) may assist an RRC_IDLE or RRC_INACTIVE UE in restricting the evaluations of cells that belong to the allowed PLMN(s) of the UE. When it comes to NR-U scenarios where multiple operators (or PLMN(s)) may operate an unlicensed frequency, the White List(s) may prevent an RRC_IDLE or RRC_INACTIVE UE from (re)selecting a cell which does not belong to the allowed PLMN(s) of the UE. In one implementation, the UE's Non-Access Stratum (NAS) may provide the Access Stratum (AS) with the information of the allowed PLMN(s) (or "allowed PLMN information"). The (AS of the) UE may evaluate the cells based on the information of allowed PLMN(s).

Area Information in White List

In one implementation, the White List(s) may include area information. The area information may include at least one of a list of Physical Cell Identities (IDs) (PCIs), a list of cell IDs, a list of RAN area IDs, a list of RAN Area Codes (RANACs), and a list of Tracking Area Codes (TACs).

PCI in White List

In one implementation, the White List may include a list of PCI(s). The cells identified by the list of PCI(s) may constitute the area, wherein the UE may measure/evaluate the cells in the area. The UE may derive the PCI of a cell upon decoding the synchronization signal (e.g., Primary Synchronization Signal (PSS) and Secondary Synchronization Signal (SSS)) in the Synchronization Signal Block (SSB) of the cell. The SSB may include a PSS, an SSS, and a Physical Broadcast Channel (PBCH). The UE may measure the signal quality of an SSB to determine the signal quality of a cell. The UE may receive and decode the SSB to determine the PCI of a cell. If the UE decodes the PBCH, the UE may further acquire the information in a Master Information Block (MIB). If the Physical Downlink Control Channel (PDCCH) parameters for SIB type 1 (SIB1) (e.g., the Information Element (IE) denoted as PDCCH-ConfigSIB1) are present in the MIB, the UE may determine a common Control Resource Set (CORESET), a common search space, and the necessary PDCCH parameters based on the PDCCH parameters for SIB1. For example, the PDCCH parameters for SIB1 (e.g., the PDCCH-ConfigSIB1 IE) may be used to configure a CORESET #0 and a search space #0. The CORESET #0 and/or search space #0 may further indicate to the UE the resources for SIB1 reception.

If the UE is provided with the White List(s) including a list of PCI(s), the UE may measure the SSB of a cell, and/or decode the PSS/SSS. If the UE determines that the PCI of the cell is one of the PCIs in the White List(s), the UE may evaluate the cell (e.g., the UE may read and acquire the SIB1 of such cell). If the UE determines that the PCI of the cell is not one of PCIs in the White List(s), the UE may not further evaluate the cell. The cells which the UE evaluates may be the candidate cells. The UE may (re)select one of the candidate cells at least based on the PCI(s) and/or the cell (re)selection criteria for the cell (re)selection procedure. The selected candidate cell, as the outcome of a cell (re)selection procedure, may be considered as a suitable cell or an acceptable cell to camp on.

In one implementation, the list of PCI(s) may have a SEQUENCE format with a size of N_PCI entries, where N_PCI represents the maximum number of cells identified by the PCI(s) to be measured. The SEQUENCE format may be a data structure specified in Abstract Syntax Notation One (ASN. 1) and used to represent a collection of one or more types/elements/entries. Each entry in the SEQUENCE may be a PCI. N_PCI may be a positive integer, for example, N_PCI may be (but not limited to) 16 or 32. The camped/serving cell of a UE may configure the UE with at most N_PCI types of PCI(s) allowed to be evaluated for the cell (re)selection procedure. In some implementations, a camped cell may refer to a cell which the UE (in RRC_IDLE state or in RRC_INACTIVE state) camps on. In some implementations, a serving cell may refer to a cell which the UE (in RRC_CONNECTED state) communicates to or which the UE maintains an RRC connection with.

In one implementation, the list of PCI(s) may be a SEQUENCE format with two entries: one is a PCI as a start value, and another one is a positive/negative integer as a range value. For example, the start value may indicate the lowest PCI in the range if the range value is positive and indicate the highest PCI in the range if the range value is negative. The absolute value of the range value may indicate the number of PCI(s) in the range. For example, if the range value is 4 and the start value is PCI_0, the White List may include PCI_0, PCI_0+1, PCI_0+2, and PCI_0+3. For example, if the range value is −4 and the start value is PCI_0, the White List may include PCI_0, PCI_0−1, PCI_0−2, and PCI_0−3. If the range value is absent and the start value is PCI_0, the White List may include PCI_0 (only). In one implementation, the range value may be indicated by the ENUMERATED format of a set of defined positive/negative values. In one implementation, the range value may be indicated by a PCI range index (e.g., PCI-RangeIndex), which may be a positive integer between 1 and a maximum number of PCI ranges.

In one implementation, the White List may include a set of PCI(s). For example, the White List may include several lists of PCI(s). Each list of PCI(s) may be any proposed format of PCI list(s) (e.g., SEQUENCE, ENUMERATED, start value, range value, or PCI range index). The UE may measure/evaluate cells identified by PCI(s) in the White List(s) for cell (re)selection.

Cell ID(s) in White List

In one implementation, the White List may include a list of Cell IDs. The cells identified by the list of Cell IDs may constitute the area, wherein the UE may measure/evaluate the cells in the area. The Cell ID may be used to identify a cell within a PLMN unambiguously. The UE may acquire the Cell ID of a cell by acquiring the information in the SIB1 of the cell. The SIB1 of a cell may include information related to cell access (e.g., CellAccessRelatedInfo IE). The information related to cell access may include a list of PLMN-specific information (e.g., a list of PLMN-IdentityInfo IEs). The size of the list of PLMN-specific information may range from one to N_PLMN, where N_PLMN may be a positive integer indicating the number of PLMN group(s). A PLMN group may include at least one PLMN. PLMN-specific information may include a list of PLMMN ID(s), at least one TAC, at least one RANAC, and/or at least one Cell ID for a set of PLMN(s) (e.g., PLMN group) identified by the list of PLMN ID(s).

If the UE is configured with the White List(s) including a list of Cell IDs, the UE may measure the SSB of a cell to determine the signal quality, and acquire the information in SIB1 of the cell at least for Cell ID. If the UE determines that the Cell ID of a cell is one of the Cell IDs in the White List(s) (e.g., by acquiring and reading the SIB1), the UE may continue evaluating such cell (e.g., by reading the cell (re)selection related parameters (e.g., cellSelectionInfo IE) in the SIB1 of such cell). If the UE determines that the Cell ID of the cell is not one of the Cell IDs in the White List(s), the UE may not further evaluate the cell. The cells which the UE evaluates may be the candidate cells. The UE may (re)select one of the candidate cells based on the Cell ID for the cell (re)selection procedure and/or the cell (re)selection criteria as the outcome of the cell (re)selection procedure.

In one implementation, the list of Cell IDs in the White List(s) may be in the SEQUENCE format of a size of N_CID (e.g., the maximum number of cells identified by the entries of Cell IDs to be measured) entries. N_CID is a positive integer. N_CID may be (but not limited to) 32. Each entry may be a Cell ID. A Cell ID may be a bit string with size N_C. N_C may be (but not limited to) 36. The UE may measure/evaluate cells identified by the Cell IDs in the White List(s) for cell (re)selection.

RANAC(s) in White List

In one implementation, the White List may include a list of RANAC(s) (e.g., RAN-AreaCode IE). The RANAC may be used to identify a RAN area within the scope of a Tracking Area (TA). The UE may acquire the RANAC of a cell by acquiring the information in SIB1 of the cell. The cells identified by the list of RANAC(s) may constitute the area, wherein the UE may measure/evaluate the cells in the area.

If the UE is configured with the White List(s) including a list of RANAC(s), the UE may measure the SSB of a cell to determine the signal quality, and acquire the information in SIB1 of the cell for the RANAC(s). If the UE determines that the RANAC of a cell is one of the RANAC(s) in the White List(s) (e.g., by acquiring and reading the SIB1), the UE may continue evaluating such cell (e.g., by reading the cell (re)selection related parameters (e.g., cellSelectionInfo IE) in the SIB1 of such cell). If the UE determines that the RANAC of the cell is not one of RANAC(s) in the White List(s), the UE may not further evaluate the cell. The cells which the UE evaluates may be the candidate cells. The UE may (re)select one of the candidate cells at least based on the RANAC(s) and/or the cell (re)selection criteria for a cell (re)selection procedure as the outcome of the cell (re) selection procedure.

In one implementation, the list of RANAC(s) in the White List(s) may be in the SEQUENCE format with a size of N_RANAC (e.g., the maximum number of RANAC(s) in the White List) entries. N_RANAC may be a positive integer. N_RANAC may be (but not limited to) 32. Each entry may be a RANAC. A RANAC may be an integer, ranging from 0 to RANAC_max. RANAC_max may be a positive integer. RANAC_max may be (but not limited to) 255. The UE may measure/evaluate cells identified by the RANAC(s) in the White List(s) for cell (re)selection.

RAN Area ID(s) in White List

In one implementation, the White List may include a list of RAN Area ID(s) (e.g., RAN-AreaConfig IE). The RAN Area ID may be used to identify a RAN area. A RAN Area ID may include a TAC and optionally a RANAC. The UE may acquire the RAN Area ID of a cell by acquiring the information in SIB1 of the cell. The cells identified by the list of RAN Area IDs may constitute the area, wherein the UE may measure/evaluate the cells in the area.

If the UE is configured with the White List(s) including a list of RAN Area ID(s), the UE may measure the SSB of a cell to determine the signal quality, and acquire the information in SIB1 of the cell at least for the RAN Area ID. If the UE determines that the RAN Area ID of a cell is one of RAN Area ID(s) in the White List(s) (e.g., by acquiring and reading the SIB1), the UE may continue evaluating such cell (e.g., by reading the cell (re)selection related parameters (e.g., cellSelectionInfo IE) in the SIB1 of such cell). If the UE determines that the RAN Area ID of the cell is not one of RAN Area ID(s) in the White List(s), the UE may not further evaluate the cell. The cells which the UE evaluates may be the candidate cells. The UE may (re)select one of the candidate cells based on the RAN Area ID(s) and/or cell (re)selection criteria for the cell (re)selection procedure as the outcome of the cell (re)selection procedure.

In one implementation, the list of RAN Area ID(s) in the White List(s) may be in the SEQUENCE format of a size of N_RANAreaID (e.g., the maximum number of RAN Area ID(s) in the White List(s)) entries. N_RANAreaID may be a positive integer. N_RANAreaID may be (but not limited to) 16 or 32. Each entry may be a RAN Area ID. A RAN Area ID may be an integer, ranging from 0 to RANAreaID_max. RANAreaID_max may be a positive integer. The UE may measure/evaluate cells identified by RAN Area ID(s) in the White List(s) for cell (re)selection.

In one implementation, the list of RAN Area ID(s) in the White List(s) may include a RAN Area Configuration, which may be in the SEQUENCE format including two entries: one is TAC, and another one is a list of RANAC(s) represented by the SEQUENCE format with size N_RANACtoTAC (e.g., the number of RANAC(s) associated with the same TAC). N_RANACtoTAC may be a positive integer. N_RANACtoTAC may be (but not limited to) 32. The list of RAN Area ID(s) in the White List(s) may include several RAN Area Configuration(s), where each RAN Area Configuration may include a TAC and a corresponding list of RANAC(s). In one implementation, the list of RAN Area ID(s) in the White List(s) may include at most (but not limited to) 16 RAN Area Configuration(s). The UE may measure/evaluate cells identified by TAC(s) and RANAC(s) in the White List(s) for cell (re)selection.

Tracking Area Code in White List

In one implementation, the White List may include a list of TAC(s). The TAC may be used to identify a TA within the scope of a PLMN. The UE may acquire the TAC of a cell by acquiring the information in SIB1 of the cell. The cells identified by the list of TAC(s) may constitute the area, wherein the UE may measure/evaluate the cells in the area.

If the UE is configured with the White List(s) including a list of TAC(s), the UE may measure the SSB of a cell to determine the signal quality, and acquire the information in SIB1 of the cell at least for TAC. If the UE determines that the TAC of a cell is one of TAC(s) in the White List(s) (e.g., by acquiring and reading the SIB1), the UE may continue evaluating such cell (e.g., by reading the cell (re)selection related parameters (e.g., cellSelectionInfo IE) in the SIB1 of such cell). If the UE determines that the TAC of the cell is not one of TAC(s) in the White List(s), the UE may not further evaluate the cell. The cells which the UE evaluates may be the candidate cells. The UE may (re)select one of the candidate cells at least based on the TAC(s) and/or cell (re)selection criteria for the cell (re)selection procedure as the outcome of the cell (re)selection procedure.

In one implementation, the list of TAC(s) in the White List(s) may be in the SEQUENCE format of a size of N_TAC (e.g., maximum number of TAC(s)) entries. N_TAC may be a positive integer. N_TAC may be (but not limited to) 16. Each entry may be a TAC. A TAC may be represented as a bit string with size TAC_max. TAC_max may be a positive integer. TAC_max may be (but not limited to) 24. The UE may measure/evaluate cells identified by TAC(s) in the White List(s) for cell (re)selection.

PLMN Information in (or Associated With) White List

In one implementation, the White List(s) may include PLMN information. The White List may include the PLMN information and the area information (e.g., list of PCI(s), list of Cell IDs, list of RANAC(s), list of RAN Area ID(s), and/or list of TAC(s)) associated with the PLMN information. In one implementation, the cell may configure the PLMN information and the White List(s) that includes the area information associated with the PLMN information to the UE, via system information or dedicated signaling. The area information associated with the PLMN information (e.g., a PLMN ID (or PLMN index), a list of PLMN IDs (or PLMN indexes)) may include a list of PCI(s), a list of Cell IDs, a list of RANAC(s), a list of RAN Area ID(s), and/or a list of TAC(s). In one implementation, the area information and the associated PLMN information may be in the (same or different) White List(s). In one implementation, the area information may be in the White List(s), while the associated PLMN information may not be.

For example, if a cell is operated by at least two PLMNs (e.g., in the RAN sharing case), the cell may broadcast at least two PLMN IDs in SIB1. The cell may also provide White List(s) for one PLMN and other White List(s) for another PLMN. The cell may indicate the White List(s) to UEs, which camp on or are served by the cell. However, UEs, which camp on or are served by the cell, may register or select different PLMNs, but these PLMNs or the E-PLMNs of these PLMNs may operate the (same) cell.

In one implementation, if the cell indicates the White List(s) to UEs via system information, the UE may receive the White List(s) that includes the PLMN information, wherein the PLMN information indicates the corresponding PLMNs operating the cell. Alternatively, the UE may receive the PLMN information and the White List(s) associated with the PLMN information. However, the UE may store and/or apply the White List(s) with (or including) PLMN information associated with its allowed PLMN(s). The UE may ignore and/or remove and/or discard the White List(s) with (or including) PLMN information not associated with its allowed PLMN(s).

In one implementation, if the cell indicates the White List(s) to UEs via dedicated signaling, the UE may (only) receive the White List(s) with (or including) PLMN information associated with its allowed (or selected) PLMN(s). The UE may receive the PLMN information associated with its allowed PLMN(s) and the White List(s) associated with the PLMN information. In one implementation, if the cell indicates the White List(s) to the UE via dedicated signaling, the UE may receive the White List(s) associated with (or including) PLMN information associated with its allowed PLMN(s) and/or forbidden PLMN(s). The UE may receive from the cell the White List(s) and the PLMN information associated with its allowed PLMN(s) and/or other forbidden PLMN(s) in the same RRC message or in different RRC message(s) respectively. The UE may store and/or apply the White List(s) with PLMN information associated with its allowed PLMN(s). The UE may store and/or apply the PLMN information associated with its allowed PLMN(s) and White List(s) with PLMN information associated with its allowed PLMN(s). The UE may remove and/or discard and/or ignore the White List(s) not associated with its allowed PLMN(s). The UE may remove and/or discard and/or ignore the PLMN information not associated with its allowed PLMN(s). In one implementation, a UE may report its allowed PLMN(s) (e.g., by network (NW) request (i.e., the UE may receive the request via an RRC message, a NAS message, a downlink control information (DCI) or a Medium Access Control (MAC) control element (CE) from the NW before the UE reports), or without NW request (i.e., the UE may not receive the request via an RRC message, a NAS message, a DCI or an MAC CE from the NW before the UE reports)) via the dedicated signaling. Based on the information of allowed PLMN(s) of the UE, the NW may decide which White List(s) to provide to the UE, if required.

In one implementation, if the cell is operated by a PLMN, the White List(s) that the cell indicates to the UE may not include the PLMN information or may not associate with the PLMN information. If the UE receives the White List(s) without PLMN information inside the White List(s) or without PLMN information associated with the White List(s) (i.e., the White List(s) the UE receives does not include PLMN information or is not associated with PLMN information), the UE may consider that the cell is operated by one PLMN. The UE may consider that the information inside the White List(s) is associated with the PLMN of the cell, where the ID of the PLMN of the cell may be broadcast by the cell in SIB1. In one implementation, if the UE (only) reads one PLMN ID/index in SIB1 of the cell (e.g., the cell is operated by one PLMN), the UE may receive the White List(s) without PLMN information inside the White List(s) or without PLMN information associated with the White List(s). When the UE measures/evaluates cells based on the White List(s) during the cell (re)selection procedure, the UE may check whether the PLMN ID(s) broadcast by the evaluated cells are the same as the PLMN ID broadcast by the cell which indicates the White List(s) to the UE. That is, even if the White List(s) does not include the PLMN information, the UE may acquire the PLMN information broadcast by the evaluated cells in SIB1 to check whether the evaluated cells are operated by the allowed PLMN(s). In one implementation, if the UE receives the White List(s) without PLMN information inside the White List(s) or without PLMN information associated with the White List(s), the UE may not check whether the PLMN ID(s) broadcast by the evaluated cells are the same as the PLMN ID broadcast by the cell which indicates the White List(s) to the UE, when the UE measures/evaluates cells based on the White List(s) during the cell (re)selection procedure. In one implementation, if the UE receives the White List(s) without PLMN information inside the White List(s) or without PLMN information associated with the White List(s), the UE may assume that the cells (indicated by the area information) listed in the White List(s) are candidates (i.e., candidate cells) as suitable cells. The suitable cells may be (1) cells that are part of either the selected PLMN or the R-PLMN or PLMN of the E-PLMN list, (2) cells that are not barred, and/or (3) cells that are part of at least one TA that is not part of the list of "Forbidden TAs," which belongs to a PLMN that fulfills case (1) described above. Once the UE performs measurements on the candidate cells and the cell selection criteria and/or the cell reselection criteria of the candidate cells are fulfilled, the UE may regard the candidate cells passing the cell selection criteria and/or the cell reselection criteria as candidate cells, among which the UE may (re)select a cell as the outcome of the cell (re)selection procedure.

PLMN ID/PLMN Index

In one implementation, the PLMN information in the White List(s) may be represented by PLMN IDs. A PLMN ID may include Mobile Country Code (MCC) and Mobile Network Code (MNC), where MCC may be optionally present. MCC may be a three-digit value. MNC may be a two-digit or three-digit value.

In one implementation, the PLMN information in the White List(s) may be represented by a PLMN index that may correspond to the index of a PLMN ID list (e.g., PLMN-IdentityList IE) in the SIB1 broadcast by the cell that configures the White List(s) to the UE. The PLMN index may be zero or a positive integer.

In one implementation, a PLMN ID (or a PLMN index) may associate with the area information (e.g., list of PCI(s), list of Cell IDs, list of RANAC(s), list of RAN Area ID(s), list of TAC(s)). A PLMN ID (or a PLMN index) and its corresponding area information may be included in a PLMN-specific Configuration in the White List(s). In one implementation, a PLMN ID (or a PLMN index) and the associated White List(s) that includes the area information may be included in a PLMN-specific Configuration. A PLMN ID (or a PLMN index) may be (or may not be) included in the associated White List(s).

In one implementation, a list of PLMN IDs (or a list of PLMN indexes) may associate with the corresponding area information. A list of PLMN IDs (or a list of PLMN indexes) may be represented by a SEQUENCE format with the size between 1 and N_PLMN (e.g., the maximum number of PLMNs operating the cell). N_PLMN may be a positive integer. N_PLMN may be (but not limited to) 12. A list of PLMN IDs (or a list of PLMN indexes) and the corresponding area information may be included in a PLMN-specific Configuration in the White List(s). In one implementation, a list of PLMN IDs (or a list of PLMN indexes) and the associated White List(s) that includes the area information may be included in a PLMN-specific Configuration. A list of PLMN ID(s) (or a list of PLMN indexes) may be (or may not be) included in the associated White List(s).

UE Behavior During Cell (Re)Selection

In one implementation, if the UE is configured with PLMN information in the White List(s) or PLMN information associated with the White List(s), the UE may measure the SSB of a cell to determine the signal quality of the cell. The cell may be indicated by the PLMN information in the White List(s) or by the PLMN information associated with the White List(s). The UE may acquire the information in SIB1 of the cell, at least for the PLMN ID/index. The UE may acquire the information in SIB1 of the cell, at least for Cell ID, RANAC, RAN Area ID, and/or TAC, associated with the PLMN information. If the UE determines that the PLMN information of a cell is indicated in the White List(s) or the same as the indicated PLMN information associated with the White List(s), the UE may continue evaluating the cell. If the UE determines that the Cell ID, RANAC, RAN Area ID, and/or TAC of a cell is associated with the PLMN information (e.g., by acquiring and reading the SIB1), the UE may continue evaluating such cell (e.g., by reading the cell (re)selection related parameters (e.g., cellSelectionInfo IE) in the SIB1 of such cell). If the UE determines that the PLMN information of a cell is not indicated in the White List(s) or is different from the indicated PLMN information associated with the White List(s), the UE may not further evaluate such cell. If the UE determines that the Cell ID, RANAC, RAN Area ID, and/or TAC of a cell is not associated with the PLMN information, the UE may not further evaluate the cell. The cells that the UE evaluates may be the candidate cells. The UE may (re)select one of the candidate cells at least based on the PLMN information and/or cell (re)selection criteria for the cell (re)selection procedure as the outcome of the cell (re)selection procedure.

NPN Information in (or Associated With) White List

The White List(s) for cell (re)selection may be applied in the NPN scenarios. The NPN scenario may be an SNPN that may be operated by an NPN operator and not relying on network functions provided by a PLMN. The NPN scenario may be a PNI-NPN that may be deployed with the support of a PLMN. The SNPN(s) may be identified by PLMN ID and/or NID broadcast in SIB1 of a cell supporting SNPN. The PNI-NPN may be identified by PLMN ID and/or CAG ID broadcast in SIB1 of a cell supporting PNI-NPN. In some implementations, the NPN scenario may involve at least one of SNPN(s) and PNI-NPN(s) operating a cell. In other words, the cell may be operated (or shared) by at least one of SNPN(s) and PNI-NPN(s). In some implementations, the UE may apply the NPN information included in (or associated with) the White List(s) and/or the White List(s) including (or associated with) the NPN information when the UE is (pre)configured with allowed NPN information (e.g., by the NAS of the UE, by the AS of the UE). The UE may apply the NPN information included in (or associated with) the White List(s) and/or the White List(s) including (or associated with) the NPN information when the UE selects a selected NPN and/or when the UE registers a registered NPN.

In one implementation, the White List(s) may include NPN information. The White List may include the NPN information and the area information (e.g., list of PCI(s), list of Cell IDs, list of RANAC(s), list of RAN Area ID(s), and/or list of TAC(s)) associated with the NPN information. In one implementation, the cell may configure NPN information and White List(s) that includes area information associated with the NPN information to the UE, via system information or dedicated signaling. The area information associated with the NPN information may include a list of PCI(s), a list of Cell IDs, a list of RANAC(s), a list of RAN Area ID(s), and/or a list of TAC(s). In one implementation, the NPN information may be represented by (1) one PLMN ID (or PLMN index) and/or one NID/CAG ID, (2) one PLMN ID (or PLMN index) and/or a list of NID(s)/CAG ID(s), (3) a list of PLMN IDs (or PLMN indexes) and/or one NID/CAG ID, and/or (4) a list of PLMN IDs (or PLMN indexes) and/or a list of NID(s)/CAG ID(s).

In one implementation, the area information and the associated NPN information may together be in the White List(s). The cell may configure the White List(s) that includes NPN information and area information associated with the NPN information to the UE, via system information or dedicated signaling. In one implementation, the area information may be in the White List(s), while the associated NPN information may not be. The cell may configure the NPN information and the associated White List(s) that includes the area information to the UE, via system information or dedicated signaling. The RRC message includes the NPN information and the RRC message includes the associated White List(s) may be the same or different.

In one implementation, a cell may provide at least two types of White List(s) (e.g., SNPN-specific White List, PNI-NPN-specific White List, normal White List), and/or the NPN information/PLMN information associated with the corresponding White List(s), to the UE via system information or dedicated signaling. The SNPN-specific White List may include the area information associated with SNPN information (e.g., including (1) one PLMN ID (or PLMN index) and/or one NID, (2) one PLMN ID (or PLMN index) and/or a list of NID(s), (3) a list of PLMN IDs (or PLMN indexes) and/or one NID, and/or (4) a list of PLMN IDs (or PLMN indexes) and/or a list of NID(s)), wherein the associated SNPN information may not be in the SNPN-specific White List. The PNI-NPN-specific White List may include the area information associated with PNI-NPN information (e.g., including (1) one PLMN ID (or PLMN index) and/or one CAG ID, (2) one PLMN ID (or PLMN index) and/or a list of CAG ID(s), (3) a list of PLMN IDs (or PLMN indexes) and/or one CAG ID, and/or (4) a list of PLMN IDs (or PLMN indexes) and/or a list of NID(s)), wherein the associated PNI-NPN information may not be in the PNI-NPN-specific White List. The normal White List may refer to a White List that is not associated with (or that does not include) the NPN information. In one implementation, the cell may signal the SNPN-specific White List, PNI-NPN-specific White List, and normal White List in different SIBs (e.g., in other System Information (other SI)) via broadcasting and/or unicasting, to the UEs. In one implementation, the NPN information and the corresponding White List(s) may be in the same SIB. The PLMN information and the corresponding White List may be in another SIB. In one implementation, the NPN information and the PLMN information may be in the same SIB (e.g., SIB1), while the corresponding NPN-specific White List(s) (e.g., SNPN-specific White List(s), PNI-NPN-specific White List(s) in another SIB, and the corresponding normal White List(s) is yet another SIB. The UE may receive the SIB(s) via (on-demand) broadcasting or via (on-demand) unicast from the cell. In one implementation, the NPN information and the PLMN information may be in the same SIB (e.g., SIB1), while the corresponding SNPN-specific White List(s), PNI-NPN-specific White List(s) and normal White List(s) are in other different SIBs. The UE may receive the SIB(s) via (on-demand) broadcasting or via (on-demand) unicast from the cell. In one implementation, the NPN information and the PLMN information may be in the same SIB (e.g., SIB1), while the corresponding NPN-specific White List(s) (e.g., SNPN-specific White List(s), PNI-NPN-specific White List(s)) in one SIB and the corresponding normal White List(s) is yet another SIB. The UE may receive the SIB(s) via (on-demand) broadcasting or via (on-demand) unicast from the cell. In one implementation, the cell may signal the SNPN-specific White List, PNI-NPN-specific White List, and normal White List in different IEs via dedicated signaling to the UE. The UE may receive the IE(s) via (on-demand) broadcasting or via (on-demand) unicast from the cell. For example, the NPN information and the corresponding White List(s) may be in the one IE. The PLMN information and the corresponding White List(s) may be in another IE. For another example, the SNPN information and the corresponding SNPN-specific White List(s) in one IE, the PNI-NPN information, and the corresponding PNI-NPN-specific White List(s) in another IE, and the PLMN information and the corresponding normal White List(s) in the other IE. For another example, the NPN information and PLMN information in one IE (or in one SIB). The corresponding NPN-specific White List(s) in another IE, and the corresponding normal PLMN information in the other IE. For another example, the NPN information and PLMN information in one IE (or in one SIB). The corresponding SNPN-specific White List(s) in another IE, and the corresponding NPI-NPN-specific White List(s) in yet another IE, and the corresponding normal PLMN information in the other IE. For another example, the NPN information in one IE (or in one SIB) and PLMN information in another IE (or in another SIB). The corresponding NPN-specific White List(s) in yet another IE, and the corresponding normal PLMN information in the other IE. For another example, the NPN information in one IE (or in one SIB) and PLMN information in another IE (or in another SIB). The corresponding SNPN-specific White List(s) in yet another IE, and the corresponding NPI-NPN-specific White List(s) in yet another IE, and the corresponding normal PLMN information in the other IE.

In one implementation, a cell may provide at least two types of White List(s) (e.g., SNPN-specific White List, PNI-NPN-specific White List, and normal White List), to the UE via system information or dedicated signaling. The SNPN-specific White List may include the SNPN information (e.g., including (1) one PLMN ID (or PLMN index) and/or one NID, (2) one PLMN ID (or PLMN index) and/or a list of NID(s), (3) a list of PLMN IDs (or PLMN indexes) and/or one NID, and/or (4) a list of PLMN IDs (or PLMN indexes) and/or a list of NID(s)) and the area information associated with SNPN information. The PNI-NPN-specific White List may include the PNI-NPN information (e.g., including (1) one PLMN ID (or PLMN index) and/or one CAG ID, (2) one PLMN ID (or PLMN index) and/or a list of CAG ID(s), (3) a list of PLMN IDs (or PLMN indexes) and/or one CAG ID, and/or (4) a list of PLMN IDs (or PLMN indexes) and/or a list of CAG ID(s)) and the area information associated with the PNI-NPN information. The normal White List may refer to the White List not associated with (or not including) the NPN information. In one implementation, the cell may signal the SNPN-specific White List(s), PNI-NPN-specific White List(s), and normal White List(s) in different SIBs (e.g., in other SI) in system information via (on-demand) broadcasting or via (on-demand) unicasting, to the UEs. For another example, the SNPN-specific White List(s) and PNI-NPN-specific White List(s) are in one SIB, while the normal White List(s) is in another SIB. In one implementation, the cell may signal the SNPN-specific White List(s), PNI-NPN-specific White List(s), and normal White List(s) in different IEs via system information and/or via dedicated signaling, to the UE. For another example, the SNPN-specific White List(s) and PNI-NPN-specific White List(s) are in one IE, while the normal White List(s) is in another IE.

In one implementation, a cell may provide (via either system information or dedicated signaling) SNPN-specific White List(s) wherein the White List(s) may (only) contain the identities that identify cells and/or their corresponding to NIDs. Another White List(s) (e.g., PNI-NPN-specific White List(s) or "normal" White List(s)) may be signaled independently from the SNPN-specific White List(s) by the cell. More specifically, those two types of White List(s) may be (on-demand) broadcasted in different SIB(s) in system information or may be signaled via different IEs. The different IEs may be included in different dedicated signaling, different RRC messages, different SIB(s), the same RRC message, or the same SIB.

For example, if a cell is operated by at least two NPNs (e.g., RAN sharing case), the cell may broadcast at least two combinations of PLMN IDs and/or NID(s)/CAG ID(s) in SIB1. The cell may also provide White List(s) for one NPN and other White List(s) for another NPN. The cell may indicate the White List(s) to UEs, which camp on or are served by the cell. However, UEs, which camp on or are served by the cell, may register or select different NPN(s), but these NPN(s) or the equivalent NPN(s) of these NPN(s) may operate the cell.

In one implementation, if the cell indicates the White List(s) to UEs via system information, the UE may receive the White List(s) including NPN information, wherein the corresponding NPN(s) operate the cell. The UE may receive the NPN information and the White List(s) associated with the NPN information. However, the UE may store and/or apply the White List(s) with (or including) NPN information associated with its allowed NPN. The UE may ignore and/or remove and/or discard the White List(s) with (or including) NPN information not associated with its allowed NPN.

In one implementation, if the cell indicates the White List(s) to UEs via dedicated signaling, the UE may (only) receive the White List(s) with NPN information associated with its allowed NPN. The UE may receive the NPN information associated with its allowed NPN and the White List(s) associated with the NPN information. If the cell indicates the White List(s) to UEs via dedicated signaling, the UE may receive the White List(s) with NPN information associated with its allowed NPN and/or other forbidden NPN(s). The UE may receive the White List(s) and NPN information associated with its allowed NPN and/or other forbidden NPN(s). The UE may store and/or apply the White List(s) with NPN information associated with its allowed PLMN(s). The UE may store and/or apply the NPN information associated with its allowed NPN and White List(s) with NPN information associated with its allowed NPN. The UE may remove and/or discard and/or ignore the White List(s) not associated with its allowed NPN. The UE may remove and/or discard and/or ignore the NPN information not associated with its allowed NPN.

In one implementation, if the cell is operated by one NPN, the White List(s), which the cell indicates to the UE, may not include the NPN information or may not associate with the NPN information. The UE may know the cell is operated by one NPN when the UE reads SIB1. If the UE receives the White List(s) without NPN information inside the White List(s) or without NPN information associated with the White List(s), the UE may consider that the cell is operated by one NPN. The UE may consider that the information inside the White List(s) is associated with the NPN of the cell, wherein the ID of NPN of the cell may be broadcast by the cell in SIB1. In one implementation, if the UE receives the White List(s) without NPN information inside the White List(s) or without NPN information associated with the White List(s), the UE may consider the area information in the White List(s) is associated with a public network, e.g., the UE's allowed (or selected) PLMN, a PLMN whose PLMN ID is broadcast by the cell in SIB1. If the ID of the associated public network matches the ID of the UE's allowed (or selected) PLMN, the UE may further perform measurement and/or evaluation based on the White List(s). Alternatively, the UE may not check whether the ID of the associated public network matches the ID of the UE's allowed (or selected) PLMN. The UE may regard the White List(s) is associated with the UE's allowed (or selected) PLMN implicitly. The UE may further perform measurement and/or evaluation based on the White List(s). When the UE measures/evaluates cells based on the White List(s) during cell (re)selection procedure, the UE may check whether the PLMN ID(s) and/or NID(s)/CAG ID(s) broadcast by the evaluated cells are the same as the PLMN ID(s) and/or NID(s)/CAG ID(s) provided (e.g., via broadcast, via dedicated signaling) by the cell which indicates the White List(s) to the UE. That is, even though the White List(s) does not include the NPN information, the UE may acquire the NPN information broadcast by the evaluated cells in SIB1 to check whether the evaluated cells are operated by allowed NPN(s). In one implementation, if the UE receives the White List(s) without NPN information inside the White List(s) or without NPN information associated with the White List(s), the UE may not check whether the PLMN ID(s) and/or NID(s)/CAG ID(s) provided (e.g., via broadcast, via dedicated signaling) by the evaluated cells are the same as the PLMN ID(s) and/or NID(s)/CAG ID(s) broadcast by the cell which indicates the White List(s) to the UE, when the UE measures/evaluates cells based on the White List(s) during cell (re)selection procedure.

PLMN ID/PLMN Index and/or NID(s)/CAG ID(s)

In one implementation, the NPN information in the White List(s) may be represented by PLMN information and/or NID(s)/CAG ID(s). The NPN information that includes the PLMN information and/or an NID may refer to an SNPN operating a cell. The NPN information that includes the PLMN information and/or a CAG ID may refer to a PNI-NPN operating a cell. The PLMN information may be (but not limited to) a PLMN ID, a PLMN index, a list of PLMN IDs, and a list of PLMN indexes.

In one implementation, the PLMN information in the White List(s) may be represented by a PLMN index that may correspond to the index of PLMN ID list (e.g., PLMN-IdentityList IE) in the SIB1 broadcast by the cell, which configures the White List(s) to the UE. Index of PLMN may correspond to the index of PLMN ID list used for NPN identification in the SIB1 broadcast by the cell, which configures the White List(s) to the UE. A PLMN index may be zero or a positive integer.

In one implementation, a combination of PLMN ID (or a PLMN index) and NID(s)/CAG ID(s), or an NID(s)/CAG ID(s), may associate with the corresponding area information (e.g., list of PCI(s), list of Cell IDs, list of RANAC(s), list of RAN Area ID(s), and/or list of TAC(s)). In one implementation, a combination of PLMN ID (or a PLMN index) and NID(s)/CAG ID(s), and its corresponding area information may be included in an NPN-specific Configuration in the White List(s). In one implementation, NID(s)/CAG ID(s) and its corresponding area information may be included in an NPN-specific Configuration in the White List(s). In one implementation, a combination of (1) PLMN ID (or a PLMN index) and NID(s)/CAG ID(s) and (2) the associated White List(s) including the area information may be included in an NPN-specific Configuration. In one implementation, NID(s)/CAG ID(s), and the associated White List(s) including the area information may be included in an NPN-specific Configuration.

In one implementation, a list of combinations of PLMN IDs (or PLMN indexes) and NID(s)/CAG ID(s) may be associated with the corresponding area information. In one implementation, a list of NID(s)/CAG ID(s) may associated with the corresponding area information. A list of combinations of PLMN IDs (or PLMN indexes) and NID(s)/CAG ID(s) may be represented by the SEQUENCE format with the size between 1 and N_NPN (e.g., the maximum number of NPN(s) operating the cell). N_NPN may be a positive integer. N_NPN may be (but not limited to) 12. In one implementation, a list of combinations of PLMN IDs (or PLMN indexes) and NID(s)/CAG ID(s), and the corresponding area information may be included in an NPN-specific Configuration in the White List(s). In one implementation, a list of NID(s)/CAG ID(s), and the corresponding area information may be included in an NPN-specific Configuration in the White List(s). In one implementation, a list of combinations of (1) PLMN IDs (or PLMN indexes) and NID(s)/CAG ID(s) and (2) the associated White List(s) including the area information may be included in an NPN-specific Configuration. In one implementation, a list of NID(s)/CAG ID(s), and the associated White List(s) including the area information may be included in an NPN-specific Configuration.

UE Behavior During Cell (Re)Selection

If the UE is configured with NPN information in the White List(s) or NPN information associated with the White List(s), the UE may measure the SSB of a cell to determine the signal quality. The UE may acquire the information in SIB1 of the cell, at least for PLMN ID/index and/or NID(s)/CAG ID(s). The UE may acquire the information in SIB1 of the cell, at least for Cell ID, RANAC, RAN Area ID, and/or TAC, associated with the NPN information. If the UE determines that the NPN information of a cell is indicated in the White List(s) or the same as the indicated NPN information associated with the White List(s), the UE may evaluate such cell (e.g., the UE may read and acquire the SIB1 of such cell). If the UE determines that the Cell ID, RANAC, RAN Area ID, and/or TAC of a cell is associated with the NPN information (e.g., by acquiring and reading SIB1), the UE may continue evaluating such cell (e.g., by reading the cell (re)selection related parameters (e.g., cellSelectionInfo IE) in the SIB1 of such cell). If the UE determines that the NPN information of a cell is not indicated in the White List(s) or is different from the indicated NPN information associated with the White List(s), the UE may not further evaluate such cell. If the UE determines that the Cell ID, RANAC, RAN Area ID, and/or TAC of a cell is not associated with the NPN information, the UE may not further evaluate the cell. The cells which the UE evaluates may be the candidate cells. The UE may (re)select one of the candidate cells based on the NPN information for the cell (re)selection procedure as the outcome of the cell (re) selection procedure.

Frequency Information in White List

In one implementation, the White List(s) may include frequency information. The White List may include the frequency information and the area information (e.g., list of PCI(s), list of Cell IDs, list of RANAC(s), list of RAN area ID(s), and/or list of TAC(s)) associated with the frequency information. In one implementation, the cell may configure frequency information and White List(s) including area information associated with the frequency information to the UE, via system information or dedicated signaling. The area information associated with the frequency information (e.g., Absolute Ratio Frequency Channel Number (ARFCN) value, frequency band list, licensed/unlicensed indicator) may include a list of PCI(s), a list of Cell IDs, a list of RANAC(s), a list of RAN Area ID(s), and/or a list of TAC(s). In one implementation, both of the area Information and the associated frequency information may be included in the White List(s). In one implementation, the area information may be included in White List(s), while the associated frequency information may not be.

In one implementation, if the UE receives the frequency information and the area information associated with the frequency information, the UE may measure the signal on the frequency indicated by the frequency information, and search for the cells indicated by the area information associated with the frequency information. The UE may determine the cells that have good signal quality and are indicated by the area information associated with the frequency information as the candidate cells. The UE may (re)select a cell from the candidate cells based on at least the frequency information and/or the cell (re)selection criteria (e.g., S criteria and/or R criteria), as the outcome of a cell (re) selection procedure. The good signal quality may refer to (but not limited to) that the measured signal of the cell is equal to or larger than a signal quality/strength threshold, and/or that the cell satisfies S criteria.

In one implementation, the White List may include the frequency information and the PLMN/NPN information (e.g., (a list of) PLMN ID(s), (a list of) PLMN index(es), (a list of) PLMN ID(s) and/or NID(s), (a list of) PLMN ID(s) and/or CAG ID(s)) associated with the frequency information. In one implementation, the cell may configure frequency information and White List(s) including PLMN/NPN information associated with the frequency information to the UE, via system information or dedicated signaling. In one implementation, the cell may configure the frequency information, the PLMN/NPN information associated with the frequency information, and the White List(s) associated with the frequency information to the UE, via system information or dedicated signaling. The PLMN information associated with the frequency information (e.g., ARFCN value, frequency band list, licensed/unlicensed indicator) may include a (list of) PLMN ID(s) and/or a (list of) PLMN index(es). The NPN information associated with the frequency information may include SNPN-specific information and/or PNI-NPN-specific information (e.g., one PLMN ID (or PLMN index) and/or one NID/CAG ID, one PLMN ID (or PLMN index) and/or a list of NID(s)/CAG ID(s), a list of PLMN IDs (or PLMN indexes) and/or one NID/CAG ID, a list of PLMN IDs (or PLMN indexes) and/or a list of NID(s)/CAG ID(s)). In one implementation, the PLMN/NPN information and the associated frequency information may together be in the White List(s). In one implementation, the PLMN/NPN information may be in the White List(s), while the associated frequency information may not be.

In one implementation, if the UE receives the frequency information and the PLMN/NPN information associated with the frequency information, the UE may measure the signal on the frequency indicated by the frequency information, and search for the cells indicated by the PLMN/NPN information associated with the frequency information. The UE may regard a cell with good signal quality that is one cell of cells indicated by the PLMN/NPN information associated with the frequency information as the candidate cells. The UE may (re)select a cell from the candidate cells based on at least the frequency information and/or cell (re)selection criteria as the outcome of the cell (re)selection procedure.

In one implementation, when the UE receives the frequency information, the UE may store and/or apply the frequency information, which indicates the frequency band(s) the UE supports, and the associated PLMN/NPN information and/or associated area information for the cell (re)selection procedure. When the UE receives the frequency information, the UE may remove and/or discard the frequency information, which indicates the frequency bands that the UE does not support, and the associated PLMN/NPN information and/or associated area information.

In one implementation, the frequency information may include the common cell (re)selection parameters (e.g., additionalPmax used for the calculation of $P_{compensation}$, $P_{EMAX, 1}$, and $P_{EMAX, 2}$, additionalSpectrumEmission) associated with the frequency related parameters in the frequency information.

ARFCN Value

The frequency information associated with the area information (and/or PLMN/NPN information) may be the Radio Frequency (RF) reference frequency used to identify the position of RF channels, SSBs, and other elements. The frequency information associated with the area information (and/or PLMN/NPN information) may be presented as an ARFCN value. The value of frequency information may be zero or a positive integer, ranging from 0 to the maximum ARFCN value. For example, the maximum ARFCN value for NR carrier frequency is 3279165. The UE may measure the reference signal (e.g., SSB, Channel State Information-Reference Signal (CSI-RS), Tracking Reference Signal (TRS)) on the frequency indicated by the frequency information. The frequency indicated by the ARFCN value may be licensed frequency or unlicensed frequency.

Frequency Band Number

The frequency information associated with the area information (and/or PLMN/NPN information) may be the frequency band number. The frequency band number may indicate the frequency band in which the reference signal (e.g., SSB, CSI-RS, TRS) is located. The frequency band number may be RAT specific. For example, the frequency band number definitions of NR frequency band number and LTE frequency band number may be different. The start value(s) and end value(s) for the NR frequency band number and LTE frequency band number may be different. The same value of the NR frequency band and that of the LTE frequency band may correspond to different frequency bands. The UE may perform measurement for the reference signal on the frequency band indicated by the frequency band number. The value of frequency information may be zero or a positive integer, ranging from 0 to the maximum frequency band number value. For example, the maximum frequency band number value for NR carrier frequency is 1024. The UE may measure the reference signal (e.g., SSB, CSI-RS, TRS) on the frequency band indicated by the frequency information. The frequency indicated by the frequency band number may be licensed frequency or unlicensed frequency.

Unlicensed/Licensed Indicator

The frequency information associated with the area information (and/or PLMN/NPN information) may include an unlicensed/licensed indicator. The unlicensed/licensed indicator may indicate whether the frequency associated with the area information (and/or PLMN/NPN information) is licensed or unlicensed. The unlicensed/licensed indicator may be a Boolean value, e.g., "1" means "licensed," "0" means "unlicensed," and vice versa. In one implementation, the unlicensed/licensed indicator may have an ENUMERATED format used in ASN. 1. The ENUMERATED format may be used for a choice within a limited set of possible values (e.g., "unlicensed" and "licensed"). For example, if the configuration is ENUMERATED(licensed), ENUMERATED(licensed) or 'licensed' may mean that the frequency is licensed, while an absent value for the configuration may be that the frequency is unlicensed. For another example, if the configuration is ENUMERATED (licensed, unlicensed), ENUMERATED(licensed) or 'licensed' may mean that the frequency is licensed, while ENUMERATED(unlicensed) or 'unlicensed' may mean that the frequency is unlicensed. In one implementation, the absence of the unlicensed/licensed indicator may mean that the frequency is unlicensed. Alternatively, the absence of the unlicensed/licensed indicator may mean that the frequency is licensed. The UE may measure the reference signal (e.g., SSB, CSI-RS, TRS) on the supported licensed (or unlicensed) frequency based on the unlicensed/licensed indicator.

List of Frequency Indicators

In one implementation, the frequency information associated with the area information (and/or PLMN Information) may include a list of frequency indicators. The frequency indicators may be (but not limited to) in the form of ARFCN value, frequency band value, and unlicensed/licensed indicator. Each frequency indicator may include the common cell (re)selection parameters (e.g., additionalPmax used for the calculation of $P_{compensation}$, $P_{EMAX, 1}$, and $P_{EMAX, 2}$, additionalSpectrumEmission) associated with the frequency related parameters in the frequency indicator. The frequency information may include the common cell (re)selection parameters associated with the frequencies indicated by the list of frequency indicators. The size of the list of frequency indicators may range from 1 to the maximum number of frequency bands supported by the cell, which may transmit the list of frequency indicators. The size of the list of frequency indicators may range from 1 to the maximum number of frequency bands supported by the UE, which may receive the list of frequency indicators. The UE may transmit its maximum number of supported frequency bands and/or the corresponding frequency band information to the cell via dedicated signaling (e.g., RRC message, UE capability message).

In one implementation, when the UE receives the list of frequency indicators, the UE may store and/or apply the frequency indicator, which indicates the frequency bands the UE supports, and the associated PLMN/NPN information and/or associated area information for the cell (re)selection procedure. When the UE receives the list of frequency indicators, the UE may remove and/or discard the frequency indicator, which indicates the frequency bands that the UE does not support, and the associated PLMN/NPN information and/or associated area information.

In one implementation, the UE may measure the reference signal (e.g., SSB, CSI-RS, TRS) on the indicated frequencies based on the list of frequency indicators and/or based on the UE's capability of supporting frequency bands. The UE may regard the cells (on the indicated frequencies) that have good signal quality and match the associated area information (and/or PLMN Information) as candidate cells. The UE may (re)select a cell from the candidate cell(s) as the outcome of the cell (re)selection procedure. The good signal quality may refer to (but not limited to) that the measured signal of the cell is equal to or larger than a signal quality/strength threshold, and/or that the cell satisfies S criteria.

Inter-RAT White List

In one implementation, the White List(s) may include at least two IE(s). For example, one IE may include the required information for cell (re)selection on one RAT (e.g., NR). The other IE may include the required information for cell (re)selection on another RAT (e.g., E-UTRA, NR-U, NPN). The required information may refer to (but not limited to) the PLMN information, area information, NPN information, NAS information, cell information and/or frequency information.

Transmission White List From a Cell to a UE

The cell may broadcast the White List (e.g., including area information and/or PLMN information and/or NPN information and/or frequency information) in SIB1, SIB3, SIB4, SIB5, and/or other SIB(s), to UE(s). The cell may broadcast the PLMN information associated with the White List in SIB1, SIB3, SIB4, SIB5, and/or other SIB(s), to UE(s). The cell may broadcast the NPN information associated with the White List in SIB1, SIB3, SIB4, SIB5, and/or other SIB(s), to UE(s). The cell may broadcast the frequency information associated with the White List in SIB1, SIB3, SIB4, SIB5, and/or SIB(s), to UE(s).

The UE may receive the White List (e.g., including area information and/or PLMN information and/or NPN information and/or frequency information) in SIB1, SIB3, SIB4, SIB5, and/or other SIB(s), from a cell. The UE may receive the PLMN information associated with the White List in SIB1, SIB3, SIB4, SIB5, and/or other SIB(s), from a cell. The UE may receive the NPN information associated with the White List in SIB1, SIB3, SIB4, SIB5, and/or other SIB(s), from a cell. The UE may receive the frequency information associated with the White List in SIB1, SIB3, SIB4, SIB5, and/or other SIB(s), from a cell. In one implementation, the UE may check the status of other SI (e.g., SIB3, SIB4, SIB5, and/or other SIB(s)) to identify whether other SI is broadcast by an indicator in SIB1. If other SI is broadcast, the UE may receive the broadcast other SI. If other SI is not broadcast, the UE may perform the SI request procedure and request for other SI.

SIB3

In one implementation, the UE may receive the White List(s), and/or PLMN information associated with the White List(s), and/or NPN information associated with the White List(s) and/or the frequency information associated with the White List(s), in SIB3 from a cell, when the frequency (explicitly or implicitly) indicated by the frequency information is the intra-frequency corresponding to the frequency on which the UE camps or operates. In some implementations, the intra-frequency of a frequency may be the same as the frequency or may (partially) overlap with the frequency.

In one implementation, if the frequency information associated with the White List(s) in SIB3 is absent or no frequency information is associated with the White List(s) in SIB3, the UE may regard the White List(s) associated with the intra-frequency corresponding to the frequency on which the UE camps or operates.

The UE may perform the intra-frequency cell (re)selection based on the White List(s) received in SIB3 from a cell. The UE may receive the PLMN information, NPN information and/or frequency information associated with the White List(s) in SIB1, SIB3, and/or other SI, from the cell. The UE may perform intra-frequency cell (re)selection based on the received PLMN information, NPN information and/or frequency information associated with the White List(s), wherein the UE receives the White List(s) in SIB3.

SIB4

In one implementation, the UE may receive the White List(s), and/or PLMN information associated with the White List(s), and/or NPN information associated with the White List(s), and/or the frequency information associated with the White List(s), in SIB4 from a cell, when the frequency (explicitly or implicitly) indicated by the frequency information is the inter-frequency corresponding to the frequency on which the UE camps or operates. In some implementations, the inter-frequency of a frequency may be different from the frequency, may (partially) overlap with the frequency, or may not overlap with the frequency.

In one implementation, if the frequency information associated with the White List(s) in SIB4 is absent or no frequency information is associated with the White List(s) in SIB4, the UE may regard the White List(s) in SIB4 associated with the (or any) inter-frequency compared to the frequency on which the UE camps or operates. The UE may regard a frequency band, which the UE supports, other than the frequency on which the UE camps or operates, as the frequency band(s) associated with the White List(s) in SIB4.

The UE may perform the inter-frequency cell (re)selection based on the White List(s) received in SIB4 from a cell. The UE may receive the PLMN information and/or NPN information and/or frequency information associated with the White List(s) in SIB1, SIB4, and/or other SI, from the cell. The UE may perform inter-frequency cell (re)selection based on the received PLMN information and/or NPN information and/or frequency information associated with the White List(s), wherein the UE receives the White List(s) in SIB4.

SIB5

In one implementation, the UE may receive the White List(s), and/or PLMN information associated with the White List(s), and/or NPN information associated with the White List, and/or the frequency information associated with the White List(s), in SIB5 from a cell, when the frequency (explicitly or implicitly) indicated by the frequency information is the inter-RAT frequency corresponding to the frequency on which the UE camps or operates. The inter-RAT frequency may be intra-frequency or inter-frequency compared to the frequency on which the UE camps or operates. In some implementations, the RAT operating on the inter-RAT frequency of a frequency may be different from the RAT operating on the frequency.

In one implementation, if the frequency information associated with the White List(s) in SIB5 is absent or no frequency information is associated with the White List(s) in SIB5, the UE may regard the White List(s) in SIB5 associated with the intra-frequency compared to the frequency on which the UE camps or operates. The UE may perform the intra-frequency inter-RAT cell (re)selection based on the White List(s) received in SIB5 from a cell.

In one implementation, if the frequency information associated with the White List(s) in SIB5 is absent or no frequency information is associated with the White List(s) in SIB5, the UE may regard the White List(s) in SIB5 associated with the inter-frequency compared to the frequency on which the UE camps or operates. The UE may regard a frequency band, which the UE supports, other than the frequency on which the UE camps or operates, as the frequency band(s) associated with the White List(s) in SIB5.

The UE may perform the inter-frequency inter-RAT cell (re)selection based on the White List(s) received in SIB5 from a cell.

The UE may perform the inter-RAT cell (re)selection based on the White List(s) received in SIB5 from a cell. The UE may receive the PLMN information and/or NPN information and/or frequency information associated with the White List(s) in SIB1, SIB5, and/or other SI, from the cell. The UE may perform inter-RAT cell (re)selection based on the received PLMN information and/or NPN information and/or frequency information associated with the White List(s), wherein the UE receives the White List in SIB5.

SIB1

In one implementation, the UE may receive the White List(s), and/or PLMN information associated with the White List(s), and/or NPN information associated with the White List, and/or the frequency information associated with the White List(s), in SIB1 from a cell, when the frequency (explicitly or implicitly) indicated by the frequency information is the intra-frequency (or inter-frequency, or inter-RAT intra-frequency, or inter-RAT inter-frequency) corresponding to the frequency on which the UE camps or operates.

In one implementation, if the frequency information associated with the White List(s) in SIB1 is absent or no frequency information is associated with the White List(s) in SIB1, the UE may regard the White List in SIB1 associated with the intra-frequency (or inter-frequency, or inter-RAT intra-frequency, or inter-RAT inter-frequency) compared to the frequency on which the UE camps or operates. If the association is the inter-frequency or inter-RAT inter-frequency, the UE may regard a frequency band, which the UE supports, other than the frequency on which the UE camps or operates, as the frequency band(s) associated with the White List(s) in SIB1.

The UE may perform the intra-frequency (or inter-frequency, or inter-RAT intra-frequency, or inter-RAT inter-frequency) cell (re)selection based on the White List(s) received in SIB1 from a cell. The UE may receive the PLMN information and/or NPN information and/or frequency information associated with the White List(s) in SIB1, and/or other SI, from the cell. The UE may perform the intra-frequency (or inter-frequency, or inter-RAT intra-frequency, or inter-RAT inter-frequency) cell (re)selection based on the received PLMN information and/or NPN information and/or frequency information associated with the White List(s), wherein the UE receives the White List(s) in SIB1.

In one implementation, the UE may receive the White List(s) used for intra-frequency cell (re)selection procedure in SIB1. In one implementation, the UE may receive the White List(s) used for intra-frequency cell (re)selection procedure in SIB3. In one implementation, the UE may receive one White List used for intra-frequency cell (re) selection procedure in SIB1, and another White List used for intra-frequency cell (re)selection procedure in SIB3. It is possible that the cell(s) or area(s) indicated by the White List received in SIB1 are a subset of the cell(s) or area(s) indicated by the White List received in SIB3. It is possible that the cell(s) or area(s) indicated by the White List received in SIB1 are the same as the cell(s) or area(s) indicated by the White List received in SIB3. In one implementation, if the UE successfully receives the White List in SIB3, the UE may (store and) apply the White List received from SIB3, rather than the White List received from SIB1, for intra-frequency cell (re)selection. In one implementation, if the UE successfully receives the White List in SIB3, the UE may (store and) apply the White List received from SIB3 for intra-frequency cell (re)selection, and ignore (or remove) the White List received from SIB1 afterward.

In one implementation, once the UE successfully receives the White List(s) in SIB1, the UE may (store and) apply the White List(s) received from SIB1 for intra-frequency cell (re)selection. Once the UE successfully receives the White List(s) in SIB3, the UE may (store and) apply the White List(s) received from SIB3 for intra-frequency cell (re) selection. That is, the UE may (store and) apply the White List(s) received from any SIB(s) (e.g., SIB1, SIB3) to replace the White List(s) received before (or stored before), for intra-frequency cell (re)selection. Alternatively, the UE may (store and) apply the White List(s) received from any SIB(s) (e.g., SIB1, SIB3), and remove (or ignore) the White List(s) received before (or stored before), for intra-frequency cell (re)selection.

In one implementation, the UE may receive the White List used for inter-frequency cell (re)selection procedure in SIB1. In one implementation, the UE may receive the White List used for inter-frequency cell (re)selection procedure in SIB4. In one implementation, the UE may receive one White List used for inter-frequency cell (re)selection procedure in SIB1, and another White List used for inter-frequency cell (re)selection procedure in SIB4. It is possible that the cell(s) or area(s) indicated by the White List received in SIB1 are a subset of the cell(s) or area(s) indicated by the White List received in SIB4. It is possible that the cell(s) or area(s) indicated by the White List received in SIB1 are the same as the cell(s) or area(s) indicated by the White List received in SIB4. In one implementation, if the UE successfully receives the White List in SIB4, the UE may (store and) apply the White List received from SIB4, rather than the White List received from SIB1, for inter-frequency cell (re)selection. In one implementation, if the UE successfully receives the White List in SIB4, the UE may (store and) apply the White List received from SIB4 for inter-frequency cell (re)selection, and ignore (or remove) the White List received from SIB1 afterward.

In one implementation, once the UE successfully receives the White List(s) in SIB1, the UE may (store and) apply the White List(s) received from SIB1 for inter-frequency cell (re)selection. In one implementation, once the UE successfully receives the White List(s) in SIB4, the UE may (store and) apply the White List(s) received from SIB4 for inter-frequency cell (re)selection. That is, the UE may (store and) apply the White List(s) received from any SIB(s) (e.g., SIB1, SIB4) to replace the White List(s) received before (or stored before), for inter-frequency cell (re)selection. Alternatively, the UE may (store and) apply the White List(s) received from any SIB(s) (e.g., SIB1, SIB4), and remove (or ignore) the White List(s) received before (or stored before), for inter-frequency cell (re)selection.

In one implementation, the UE may receive the White List used for inter-RAT (inter-frequency or intra-frequency) cell (re)selection procedure in SIB1. In one implementation, the UE may receive the White List used for inter-RAT (inter-frequency or intra-frequency) cell (re)selection procedure in SIB5. In one implementation, the UE may receive one White List used for inter-RAT (inter-frequency or intra-frequency) cell (re)selection procedure in SIB1, and another White List used for inter-RAT (inter-frequency or intra-frequency) cell (re)selection procedure in SIB5. It is possible that the cell(s) or area(s) indicated by the White List received in SIB1 are a subset of the cell(s) or area(s) indicated by the White List received in SIB5. It is possible that the cell(s) or area(s) indicated by the White List received in SIB1 are the same as the cell(s) or area(s) indicated by the White List received in SIB5. In one implementation, if the UE successfully receives the White List in SIB5, the UE may (store and) apply the White List received from SIB5, rather than the White List received from SIB1, for inter-RAT (inter-frequency or intra-frequency) cell (re)selection. In one implementation, if the UE successfully receives the White List in SIB5, the UE may (store and) apply the White List received from SIB5 for inter-RAT (inter-frequency or intra-frequency) cell (re)selection, and ignore (or remove) the White List received from SIB1 afterward.

In one implementation, once the UE successfully receives the White List(s) in SIB1, the UE may (store and) apply the White List(s) received from SIB1 for inter-RAT (inter-frequency or intra-frequency) cell (re)selection. In one implementation, once the UE successfully receives the White List(s) in SIB5, the UE may (store and) apply the White List(s) received from SIB5 for inter-RAT (inter-frequency or intra-frequency) cell (re)selection. That is, the UE may (store and) apply the White List(s) received from any SIB(s) (e.g., SIB1, SIB5) to replace the White List(s) received before (or stored before), for inter-RAT (inter-frequency or intra-frequency) cell (re)selection. Alternatively, the UE may (store and) apply the White List(s) received from any SIB(s) (e.g., SIB1, SIB5), and remove (or ignore) the White List(s) received before (or stored before), for inter-RAT (inter-frequency or intra-frequency) cell (re)selection.

The proposed implementations may also be applicable for the cases when the UE may receive the White List from SIB1 and/or the White List from other SI (e.g., SIB3, SIB4, SIB5, other SIB(s)), wherein the White List is used for the same purpose (e.g., intra-frequency cell (re)selection, inter-frequency cell (re)selection, inter-RAT intra-frequency cell (re)selection, inter-RAT inter-frequency cell (re)selection).

Dedicated Signaling

In one implementation, the UE may receive the White List(s), and/or PLMN information associated with the White List(s), and/or NPN information associated with the White List(s), and/or the frequency information associated with the White List(s), via dedicated signaling from a cell, when the frequency (explicitly or implicitly) indicated by the frequency information is the intra-frequency, inter-frequency, inter-RAT intra-frequency, and/or inter-RAT inter-frequency corresponding to the frequency on which the UE camps or operates. The inter-RAT frequency may be intra-frequency or inter-frequency compared to the frequency on which the UE camps or operates. The White List(s) (and/or PLMN information associated with the White List(s), and/or NPN information associated with the White List(s), and/or the frequency information associated with the White List(s)) that the UE receives via dedicated signaling from a cell may be referred to "UE-specific" White List(s), and/or "UE-specific" PLMN information associated with the "UE-specific" White List(s), and/or "UE-specific" NPN information associated with the "UE-specific" White List(s), and/or "UE-specific" frequency information associated with the "UE-specific" White List(s).

In one implementation, the UE may receive the "UE-specific" White List(s) via dedicated signaling from a cell, while the UE may receive the "cell-specific" PLMN information associated with the "UE-specific" White List(s) and/or the "cell-specific" NPN information associated with the "UE-specific" White List(s) and/or the "cell-specific" frequency information associated with the "UE-specific" White List(s) via the system information (e.g., SIB1, SIB3, SIB4, SIB5, other SIB(s)).

In one implementation, the RRC_CONNECTED UE (i.e., the UE in RRC_CONNECTED state) may receive the "UE-specific" White List(s), and/or the "UE-specific" PLMN information associated with the "UE-specific" White List(s), and/or the "UE-specific" NPN information associated with the "UE-specific" White List(s), and/or the "UE-specific" frequency information associated with the "UE-specific" White List(s), via RRC message (e.g., RRC (Connection) Reconfiguration message).

In one implementation, the RRC_CONNECTED UE may receive the "UE-specific" White List(s), and/or the "UE-specific" PLMN information associated with the "UE-specific" White List(s), and/or the "UE-specific" NPN information associated with the "UE-specific" White List(s), and/or the "UE-specific" frequency information associated with the "UE-specific" White List(s), via RRC message (e.g., RRC (Connection) Release message), and perform state transition to enter RRC_IDLE state.

In one implementation, the RRC_CONNECTED UE may receive the "UE-specific" White List(s), and/or the "UE-specific" PLMN information associated with the "UE-specific" White List(s), and/or the "UE-specific" NPN information associated with the "UE-specific" White List(s), and/or the "UE-specific" frequency information associated with the "UE-specific" White List(s), via RRC message (e.g., in the suspend configuration within RRC (Connection) Release with suspend configuration message), and perform state transition to enter RRC_INACTIVE state.

In one implementation, the RRC_INACTIVE UE (i.e., the UE in RRC_INACITVE state) may receive the "UE-specific" White List(s), and/or the "UE-specific" PLMN information associated with the "UE-specific" White List(s), and/or the "UE-specific" NPN information associated with the "UE-specific" White List(s), and/or the "UE-specific" frequency information associated with the "UE-specific" White List(s), via RRC message (e.g., RRC (Connection) Release message), and perform state transition to enter RRC_IDLE state.

In one implementation, the RRC_INACTIVE UE may receive the "UE-specific" White List(s), and/or the "UE-specific" PLMN information associated with the "UE-specific" White List(s), and/or the "UE-specific" NPN information associated with the "UE-specific" White List(s), and/or the "UE-specific" frequency information associated with the "UE-specific" White List(s), via RRC message (e.g., RRC (Connection) Reject message), wherein the RRC message (e.g., RRC (Connection) Reject message) is in response to another RRC message (e.g., RRC (Connection) Resume Request message, RRC (Connection) Resume Request 1 message) transmitted by the UE to the cell.

In one implementation, the RRC_IDLE UE (i.e., the UE in RRC_IDLE state) may receive the "UE-specific" White List(s), and/or the "UE-specific" PLMN information associated with the "UE-specific" White List(s), and/or the "UE-specific" NPN information associated with the "UE-specific" White List(s), and/or the "UE-specific" frequency information associated with the "UE-specific" White List(s), via RRC message (e.g., RRC (Connection) Reject message), wherein the RRC message (e.g., RRC (Connection) Reject message) is in response to another RRC message (e.g., RRC (Connection) Setup Request message) transmitted by the UE to the cell.

In one implementation, the UE may (only) receive the "cell-specific" White List(s) used for intra-frequency, inter-frequency, and/or inter-RAT (inter-frequency or intra-frequency) cell (re)selection procedure(s) via the system information. In one implementation, the UE may (only) receive the "UE-specific" White List(s) used for intra-frequency, inter-frequency, and/or inter-RAT (inter-frequency or intra-frequency) cell (re)selection procedure via dedicated signaling. In one implementation, the UE may receive "cell-specific" White List(s) used for intra-frequency, inter-frequency, and/or inter-RAT (inter-frequency or intra-frequency) cell (re)selection procedure(s) via the system information, and other "UE-specific" White List(s) used for intra-frequency, inter-frequency, and/or inter-RAT (inter-frequency or intra-frequency) cell (re)selection procedure(s) via dedicated signaling. The cell(s) or area(s) indicated by the "cell-specific" White List(s) received via the system information may be a subset of the cell(s) or area(s) indicated by the "UE-specific" White List(s) received via dedicated signaling. It is possible that the cell(s) or area(s) indicated by the "cell-specific" White List(s) received via the system information is the same as the cell(s) or area(s) indicated by the "UE-specific" White List(s) received via dedicated signaling. It is possible that some of the cell(s) or area(s) indicated by the "cell-specific" White List(s) received via the system information are the same as some of the cell(s) or area(s) indicated by the "UE-specific" White List(s) received via dedicated signaling. In one implementation, if the UE successfully receives the "UE-specific" White List(s) via dedicated signaling, the UE may (store and) apply the "UE-specific" White List(s) received via dedicated signaling, rather than the "cell-specific" White List(s) received via the system information, for intra-frequency, inter-frequency, and/or inter-RAT (inter-frequency or intra-frequency) cell (re)selection procedure(s). In one implementation, if the UE successfully receives the "UE-specific" White List(s) via dedicated signaling, the UE may (store and) apply the "UE-specific" White List(s) received via dedicated signaling for intra-frequency, inter-frequency, and/or inter-RAT (inter-frequency or intra-frequency) cell (re)selection procedure(s), and ignore (or remove) the "cell-specific" White List(s) received via the system information afterward.

In one implementation, once the UE successfully receives the "cell-specific" White List(s) via system information, the UE may (store and) apply the "cell-specific" White List(s) received via system information for intra-frequency, inter-frequency, and/or inter-RAT (inter-frequency or intra-frequency) cell (re)selection procedure(s). In one implementation, once the UE successfully receives the "UE-specific" White List via dedicated signaling, the UE may (store and) apply the "UE-specific" White List received via dedicated signaling for intra-frequency, inter-frequency, and/or inter-RAT (inter-frequency or intra-frequency) cell (re)selection procedure(s). That is, the UE may (store and) apply the White List received from any control signaling (e.g., system information, dedicated signaling) to replace the White List received before (or stored before), for intra-frequency, inter-frequency, and/or inter-RAT (inter-frequency or intra-frequency) cell (re)selection procedure(s). In one implementation, once the UE successfully receives the "UE-specific" White List(s) via dedicated signaling, the UE may (store and) apply the "UE-specific" White List(s) received via the dedicated signaling rather than apply "cell-specific" White List(s) until the UE moves out of a configured area (e.g., an area indicated by the area information associated with the White List(s)) The UE may apply "cell-specific" White List(s) rather than "UE-specific" White List(s) while the UE moves into a newly configured area. The configured area could be a tracking area or a RAN area or a system information area (e.g., defined by a system information area code, systemInformationAreaID). In one implementation, if the White List(s) is provided via dedicated signaling, the UE may ignore (or remove) all the White List(s) provided in system information. In one implementation, if a UE is in camped on any cell state, the UE may (only) apply the White List(s) provided by system information from the current cell. In one implementation, the UE may delete (or remove) White List(s) provided via dedicated signaling when the UE enters a different RRC state, or the associated validity timer of the White List(s) expires, or a PLMN selection is performed on request by the NAS of the UE.

Approach to Handle the Case Where a UE Cannot Find Any Cell Indicated by the White List In some scenarios, during cell (re)selection procedures, the UE may not find a cell that is with good signal quality and belongs to one of the cells (or cell areas) indicated by the White List(s) configured to the UE by a camped/serving cell. The UE may not find candidate cell(s) based on the White List(s) during cell (re)selection procedure. The good signal quality may refer to (but not limited to) that the measured signal of the cell is equal to or larger than a signal quality/strength threshold, and/or that the cell satisfies S criteria.

In one implementation, the UE may determine that it cannot find candidate cell(s) based on the White List(s) during cell (re)selection procedure if a timer (T_white) expires. The value of T_white may be preconfigured or specified. The value of T_white may be configured to the UE via system information or dedicated signaling. The value of T_white may be configured to the UE together when the UE receives the associated White List(s). The UE may (re)start the timer (T_white) when the UE receives the associated White List(s). The UE may (re)start the timer (T_white) when the UE begins to perform the cell (re)selection procedure. When the UE (re)starts the timer (T_white), the UE may set the timer value to the value of T_white preconfigured (or specified or configured) to the UE.

In one implementation, if the UE cannot find any cell indicated by the White List(s), the UE may remove and/or discard the configured/stored White List(s). Additional conditions may be considered during which the UE may remove and/or discard the configured/stored White List(s). For instance:

1) If UE is stationary for a while
   a、 For example, the network/cell may configure the mobility state related parameters (e.g., high-mobility state related parameters, medium-mobility state related parameters, low-mobility state related parameters) to the UE. If the UE detects itself to be a mobility state (e.g., low-mobility state) or the UE detects its speed to be lower than a mobility state related parameter, the UE may consider itself to be stationary.
   b、 For example, the network/cell may configure the UE with a timer value to determine whether the UE has been stationary for a while. If the UE detects itself to be stationary, the UE may start the timer. The UE may stop the timer if the UE detects itself to be not stationary. If the timer expires, the UE may remove and/or discard the configured/stored White List(s).
2) If certain services (e.g., triggered by the NAS of the UE) is needed
3) If a configured timer expires In one implementation, the UE may consider the current frequency (e.g., NR-U frequency) to be the lowest priority frequency for reselection for 300 seconds, after at least one of the conditions: (1) if a timer (T_white) expires, and (2) if the candidate cell(s) the UE finds based on the White List(s) during cell (re)selection procedure on that frequency are found not suitable due to belonging to a PLMN (or NPN) which is not indicated as being equivalent to the registered (or allowed) PLMN(s) (or NPN(s)).

Possible (but not limited to) implementations to deal with the scenarios are provided.

Other SI

In one implementation, when the UE cannot find candidate cell(s) based on the White List(s) during cell (re)selection procedure(s), the UE may stop performing the cell (re)selection based on the White List(s) for a period of time (T). For example, T may be preconfigured or specified. T may be 300 s. For example, the UE may receive the T value associated with the White List(s) together when the UE receives the White List(s). The UE may receive the T value via system information or dedicated signaling. After a period of time (T) (e.g., Upon the expiry of a timer with T value), the UE may perform cell (re)selection based on the (stored) White List(s) if the UE is not configured/received with other White List(s) within the period of time, or if the UE is not configured with other cell (re)selection criteria within the period of time, or if the UE does not find (or camp on) a suitable (or acceptable) cell within the period of time.

In one implementation, if the UE cannot find candidate cell(s) based on the White List(s), the UE may still (re)select and camp on a cell not indicated in the White List(s). The UE may perform SI request procedure to the camped/serving cell to request for the (updated) White List(s).

In one implementation, the UE may receive an indicator (e.g., si-BroadcastStatus IE) broadcast by the camped/serving cell in SIB1, to determine whether the system information message carrying the (intra-frequency, inter-frequency, inter-RAT intra-frequency, or inter-RAT inter-frequency) White List(s) before the UE sends the SI request message(s) or preamble(s) to the camped/serving cell. If the UE determines that the system information message carrying the White List(s) is broadcast, the UE may receive the system information message. If the UE determines that the system information carrying the White List(s) is not broadcast, the UE may send the SI request message(s) (e.g., via MSG3 based SI request) or preamble(s) (e.g., via MSG1 based SI request) to the camped/serving cell.

In one implementation, the UE may not determine whether to send the SI request message(s) or preambles(s) to the camped/serving cell based on the indicator broadcast in SIB1. In other words, the UE may directly send the SI request message (e.g., via MSG3 based SI request) and/or preamble(s) (e.g., via MSG1 based SI request) to the camped/serving cell for the request of the system information message carrying the (intra-frequency, inter-frequency, inter-RAT intra-frequency, or inter-RAT inter-frequency) White List(s).

In one implementation, the SI request (e.g., RRC System Information Request message), which the UE sends to the camped/serving cell, may include the version number of the White List(s) or the version number of the system information message carrying the White List(s). The version number of the White List(s) or the version number of the system information message carrying the White List(s) may correspond to an indicator (e.g., value tag), indicating that the UE may not find a candidate cell based on the White List(s) and/or system information message carrying the White List(s) with the indicated version number. In response to the SI request and/or preamble(s), the camped/serving cell may respond to the UE with an updated White List.

In one implementation, once UE identifies the system information area code broadcasted in the SIB1 by the cell is different from the stored one, the UE may initiate SI request procedures to acquire a new version of White List.

Fallback to Other Cell (Re)Selection Procedure(s)

In one implementation, if the UE cannot find any candidate cell indicated by the intra-frequency White List(s), the UE may perform inter-frequency cell (re)selection based on inter-frequency White List(s), wherein the UE may have been configured with inter-frequency White List(s).

In one implementation, if the UE cannot find any candidate cell indicated by the intra-frequency White List(s), the UE may request for the inter-frequency White List(s). After the UE receives the inter-frequency White List(s), the UE may perform the cell (re)selection based on the inter-frequency White List(s).

In one implementation, if the UE cannot find any candidate cell indicated by the intra-frequency White List(s), the UE may perform inter-frequency cell (re)selection no matter whether the UE is configured with inter-frequency White List(s).

In one implementation, if the UE cannot find any candidate cell indicated by the intra-frequency White List(s), or if the UE cannot find any candidate cell indicated by the inter-frequency White List(s), or if the UE cannot find any cell during intra-frequency cell (re)selection, or if the UE cannot find any cell during inter-frequency cell (re)selection, the UE may perform inter-RAT cell (re)selection procedure, wherein the UE may have been configured with inter-RAT (inter-frequency or intra-frequency) White List(s).

In one implementation, if the UE cannot find any candidate cell indicated by the intra-frequency White List(s), or if the UE cannot find any candidate cell indicated by the inter-frequency White List(s), or if the UE cannot find any cell during intra-frequency cell (re)selection, or if the UE cannot find any cell during inter-frequency cell (re)selection, the UE may request for the inter-RAT (intra-frequency or inter-frequency) White List(s). After the UE receives the inter-RAT (inter-frequency or intra-frequency) White List(s), the UE may perform the cell (re)selection based on the inter-RAT (inter-frequency or intra-frequency) White List(s).

In one implementation, if the UE cannot find any candidate cell indicated by the intra-frequency White List(s), or if the UE cannot find any candidate cell indicated by the inter-frequency White List(s), or if the UE cannot find any cell during intra-frequency cell (re)selection, or if the UE cannot find any cell during inter-frequency cell (re)selection, the UE may perform inter-RAT (inter-frequency or intra-frequency) cell (re)selection no matter whether the UE is configured with inter-RAT (inter-frequency or intra-frequency) White List(s).

In one implementation, if the UE cannot find any candidate cell indicated by the intra-frequency White List(s), or if the UE cannot find any candidate cell indicated by the inter-frequency White List(s), or if the UE cannot find any cell during intra-frequency cell (re)selection, or if the UE cannot find any cell during inter-frequency cell (re)selection, the UE may lower the priority of the frequency on which the UE cannot find any candidate cell. The UE may lower the priority of the frequency for a period of time (T1). The value of T1 may be preconfigured or specified. The value of T1 may be configured to the UE via system information or dedicated signaling. The value of T1 may be configured to the UE together with the White List(s). In one implementation, the UE may lower the priority of the frequency to the lowest priority for a period of time (T1). The UE may lower the priority of the frequency to a configured (or defined) value. The configured value may be configured to the UE via dedicated signaling or system information. The configured value may be configured to the UE in the same information, which carries the White List(s). The configured value may be configured to the UE together with the White List(s). After a period of time (T1), the UE may recover the priority of the frequency to the priority value before the UE lowers the priority of the frequency. After a period of time (T1), the UE may recover the priority of the frequency to the priority value based on the configuration received from the cell.

In one implementation, if the UE cannot find any candidate cell indicated by the intra-frequency White List(s) on the unlicensed frequency, or if the UE cannot find any candidate cell indicated by the inter-frequency White List(s) on the unlicensed frequency, or if the UE cannot find any cell during intra-frequency cell (re)selection on the unlicensed frequency, or if the UE cannot find any cell during inter-frequency cell (re)selection on the unlicensed frequency, the UE may perform the cell (re)selection on the licensed frequency.

Cell Barring

In one implementation, if the UE cannot find any candidate cell indicated by the intra-frequency White List(s), or if the UE cannot find any candidate cell indicated by the inter-frequency White List(s), or if the UE cannot find any cell during intra-frequency cell (re)selection, or if the UE cannot find any cell during inter-frequency cell (re)selection, the UE may bar the cell(s) indicated in the intra-frequency White List(s), inter-frequency White List(s), or inter-RAT (intra-frequency or inter-frequency) White List(s). The UE may bar these cell(s) (or ignore (or suspend or remove) the (intra-frequency, inter-frequency, inter-RAT (intra-frequency or inter-frequency)) White List configuration) for a period of time (T2). The value of T2 may be preconfigured or specified. The value of T2 may be configured to the UE via system information or dedicated signaling. The value of T2 may be configured to the UE together with the White List(s) indicating the barred cell(s). The value of T2 may be configured to the UE in the same information, which carries the White List(s). If the cell is barred, the UE may not (re)select the barred cell. If the UE ignores (or suspends or removes) the (intra-frequency, inter-frequency, inter-RAT (intra-frequency or inter-frequency)) White List configuration, the UE may not perform cell (re)selection based on the White List configuration. After the period of time (T2), the UE may not bar the cell(s). After the period of time (T2), the UE may (store and) apply the (intra-frequency, inter-frequency, inter-RAT (intra-frequency or inter-frequency)) White List configuration for cell (re)selection. Thus, the UE may (re)select the cell(s).

Top N-Strongest Cells

In one implementation, if the UE cannot find any candidate cell indicated by the intra-frequency White List(s), or if the UE cannot find any candidate cell indicated by the inter-frequency White List(s), or if the UE cannot find any cell during intra-frequency cell (re)selection, or if the UE cannot find any cell during inter-frequency cell (re)selection, the UE may perform cell (re)selection based on the top-N strongest cell(s) on the corresponding (intra-, inter-, licensed, or unlicensed) frequency. The UE may measure the reference signal (e.g., SSB, CSI-RS, TRS) of the cell(s) on the corresponding (intra-, inter-, licensed, or unlicensed) frequency. The UE may further read the SIB1 of the top-N strongest cell(s), to determine whether the PLMN (or NPN) operating the top-N strongest cell(s) belongs to the UE's allowed PLMN(s) (or NPN(s)). If the UE (only) finds top-M strongest cell(s), where M is less than N, the UE may further read the SIB1 of the top-M strongest cell(s), to determine whether the PLMN (or NPN) operating the top-M strongest cell(s) belongs to the UE's allowed PLMN(s) (or NPN(s)). The UE may (re)select a cell whose PLMN (or NPN) belongs to the UE's allowed PLMN(s) (or NPN(s)), wherein the (re)selected cell is one of the top-N (or top-M) strongest cell(s). The UE may (re)select a cell whose PLMN (or NPN) belongs to the UE's allowed PLMN(s) (or NPN(s)), wherein the (re)selected cell has the strongest signal strength (e.g., Reference Signal Received Power (RSRP), Reference Signal Received Quality (RSRQ)) among the top-N (or top-M) strongest cell(s) whose PLMN (or NPN) belongs to the UE's allowed PLMN(s) (or NPN(s)). The value of N may be preconfigured or specified. The UE may receive the value of N via system information or dedicated signaling. The UE may receive the value of N together with the White List(s). The UE may receive the value of N in the same information where the UE receives the White List(s).

Enter Any Cell Selection Sub-State

In one implementation, if the RRC_INACTIVE UE cannot find any candidate cell indicated by the intra-frequency White List(s), or if the RRC_INACTIVE UE cannot find any candidate cell indicated by the inter-frequency White List(s), or if the RRC_INACTIVE UE cannot find any cell during intra-frequency cell (re)selection, or if the RRC_INACTIVE UE cannot find any cell during inter-frequency cell (re)selection, the RRC_INACTIVE UE may enter 'Any Cell Selection sub-state' of the RRC_INACTIVE state.

In one implementation, if the RRC_IDLE UE cannot find any candidate cell indicated by the intra-frequency White List(s), or if the RRC_IDLE UE cannot find any candidate cell indicated by the inter-frequency White List(s), or if the RRC_IDLE UE cannot find any cell during intra-frequency cell (re)selection, or if the RRC_IDLE UE cannot find any cell during inter-frequency cell (re)selection, the RRC_IDLE UE may enter 'Any Cell Selection sub-state' of the RRC_IDLE state. In "Any Cell Selection sub-state," the UE may perform cell (re)selection procedure without considering the White List(s).

In 'Any Cell Selection sub-state,' the UE may perform cell (re)selection procedure without considering the White List(s). In one implementation, in 'Any Cell Selection sub-state,' the UE may perform cell (re)selection procedure based on the White List(s).

In one implementation, an Inactive-state-specific White List may be provided wherein the Inactive-state-specific White List may be different from an Idle-state-specific White List. The UE may receive the Inactive-state-specific White List via RRC message (e.g., RRC Reconfiguration message with suspend configuration, in the suspend configuration of an RRC Reconfiguration message) or via system information from the serving cell. The UE may receive the Idle-state-specific White List via RRC message (e.g., RRC Release message) or via system information. An RRC_INACTIVE UE may (store and) apply the Inactive-state-specific White List to perform cell (re)selection, and an RRC_IDLE UE may (store and) apply the Idle-state-specific White List to perform cell (re)selection. If the RRC_INACTIVE UE transitions to RRC_IDLE, the UE may remove and/or ignore the Inactive-state-specific White List. When the RRC_INACTIVE UE transitions to RRC_IDLE, the UE may be configured with the Idle-state-specific White List either via dedicated signaling or via system information. An RRC_INACTIVE UE may receive (and store) the Idle-state-specific White List via system information. An RRC_INACTIVE UE may perform cell (re)selection based on the Inactive-state-specific White List if the Inactive-state-specific White List is configured. If the Inactive-state-specific White List is not configured, the RRC_INACTIVE UE may perform cell (re)selection based on the Idle-state-specific White List.

Minimization of Drive Test (MDT) Report

In one implementation, if the UE cannot find any candidate cell indicated by the intra-frequency White List(s), or if the UE cannot find any candidate cell indicated by the inter-frequency White List(s), or if the UE cannot find any cell during intra-frequency cell (re)selection, or if the UE cannot find any cell during inter-frequency cell (re)selection, the UE may report the White List(s) and/or the ID of the cell providing the White List(s), to a camped/serving cell via dedicated signaling, when the UE camps on or connects to a camped/serving cell. The camped/serving cell may be (may not be) the same as the cell providing the White List(s) to the UE. If the camped/serving cell is the same as the cell providing the White List(s) to the UE, the UE may report the White List(s) to the camped/serving cell. If the camped/serving cell is the same as the cell providing the White List(s) to the UE, the UE may report an indicator corresponding to the White List(s) to the camped/serving cell. If the camped/serving cell is different from the cell providing the White List(s) to the UE, the UE may report both the White List(s) and the ID of the cell providing the White List(s), to the camped/serving cell.

Indicator to Indicate Whether to Use the White List(s)

In one implementation, the UE may be configured with an indicator to indicate whether the UE may (store and) apply the White List(s) for cell (re)selection. If the indicator is set to be 'true,' the UE may (only) consider the cells that satisfy the White List(s) as candidate cells for cell (re)selection. If the indicator is set to be 'true,' the UE may consider (only) the cells included the White List(s) are applicable for cell (re)selection. If the indicator is set to be 'false,' the UE may perform cell (re)selection without considering the White List(s). If the cell does not provide the indicator, the UE may perform cell (re)selection considering the White List(s). That is, the White List(s) may be valid by default if the cell does not provide the indicator.

The UE may receive the indicator via system information or dedicated signaling from the cell providing the White List(s). The White List(s) may include the indicator associated with the White List(s). The configuration including the White List(s) may include the indicator associated with the White List(s) in the configuration. The UE may receive the indicator together with the reception of the White List(s).

White List for Cell Selection

In one implementation, for the unlicensed frequency, cell selection may include two categories: initial cell selection (no prior knowledge of which RF channels are unlicensed frequencies (e.g., NR-U frequencies)), cell selection by leveraging stored information.

For initial cell selection, the UE may scan all RF channels in the unlicensed frequency bands (e.g., NR-U bands) according to the UE's capabilities to find a suitable cell. On each frequency, the UE may not (only) search for the strongest cell. The UE may search for top-Ns strongest cell(s). The UE may measure the reference signal (e.g., SSB) of the cell(s) on the corresponding frequencies. The UE may further read the SIB1 of the top-Ns strongest cell(s), to determine whether the cell is suitable. If the UE (only) finds top-Ms strongest cell(s), where Ms is less than Ns, the UE may further read the SIB1 of the top-Ms strongest cell(s), to determine whether the cell is suitable. The UE may select a cell that is suitable, wherein the selected cell is one of the top-Ns (or top-Ms) strongest cell(s). The UE may select a cell that is suitable, wherein the selected cell has the strongest signal strength (e.g., RSRP, RSRQ) among the top-Ns (or top-Ms) strongest cell(s) which are suitable cell(s). The value of Ns may be preconfigured or specified. The value of Ns may be infinite. The UE may receive the value of Ns via system information or dedicated signaling. The UE may receive the value of Ns together with the White List(s). The UE may receive the value of Ns in the same information where the UE receives the White List(s). In one implementation, if the UE finds that a ID of PLMN (or a ID of NPN) broadcast by a cell in SIB1 does not belong to the UE's allowed PLMN(s) (or NPN(s)), and also the cell broadcasts the White List(s) associated with the PLMN (or NPN), the UE may skip reading the SIB1 of the cell(s) indicated by the White List(s) broadcast by a cell whose PLMN (or NPN) does not belong to the UE's allowed PLMN(s) (or NPN(s)).

The cell selection by leveraging stored information may require stored information of (unlicensed) frequencies and optionally also information on cell parameters from previously received measurement control IEs or from previously detected cells. The stored information may include (but not limited to) the White List(s). Once the UE has found a suitable cell, the UE may select it. In one implementation, during cell selection by leveraging stored information, if the UE finds that a PLMN (or NPN) broadcast by a cell in SIB1 that does not belong to the UE's allowed PLMN(s) (or NPN(s)), and also the cell broadcasts the White List(s) associated with the PLMN (or NPN), the UE may skip reading the SIB1 of the cell(s) indicated by the White List(s) broadcast by a cell whose PLMN (or NPN) does not belong to the UE's allowed PLMN(s) (or NPN(s)). If no suitable cell is found, the UE may perform an initial cell selection procedure.

The terms "NW", "network" "cell," "BS," "gNB," "eNB," and "ng-eNB" may be utilized interchangeably in the present disclosure.

System information may refer to MIB, SIB1, or other SI. Minimum SI may include MIB and SIB1. Other SI may refer to SIB3, SIB4, SIB5, and other SIB(s). The UE may receive the system information via broadcast from a cell. The cell may periodically broadcast the system information. The cell may broadcast the system information due to the SI request from a UE. The UE may receive the system information in an RRC message via dedicated signaling from a cell. The cell may transmit the system information in the RRC message due to the SI request from a UE.

Dedicated signaling may refer to (but not limited to) RRC message(s). For example, RRC (Connection) Setup Request message, RRC (Connection) Setup message, RRC (Connection) Setup Complete message, RRC (Connection) Reconfiguration message, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message.

An allowed PLMN for a UE may be (but not limited to) an R-PLMN, a selected PLMN, or E-PLMN(s) of a UE.

An allowed NPN for a UE may be (but not limited to) a Registered NPN (R-NPN), a Selected NPN, or Equivalent NPN(s) (E-NPN(s)) of a UE. The NPN may be SNPN or NPI-NPN.

In one implementation, a Registered NPN may broadcast a PLMN ID of an R-PLMN. A Selected NPN may broadcast a PLMN ID of a Selected PLMN. An Equivalent NPN may broadcast a PLMN ID of an E-PLMN.

The UE may measure the signal strength of a cell in terms of RSRP, RSRQ, and RSSI. If a cell is with good signal quality, the UE may determine that the measured signal strength of a cell is larger than (or equal to) a threshold. For example, the measured RSRP of a cell is larger than (or equal to) an RSRP threshold. For example, the measured RSRQ of a cell is above (or equal to) an RSRQ threshold. For example, the measured RSSI of a cell is above (or equal to) an RSSI threshold. If a cell fulfills S criteria, the measured signal strength of the cell is larger than (or equal to) a threshold in terms of RSRP and/or RSRQ. For the cell reselection criteria (e.g., R criteria), the UE may apply the measured signal strength of the serving/camped cell and neighboring cells, and determine the rank of each cell based on the measured signal strength of each cell. The UE may determine whether to select a cell based on the rank and certain rules according to the rank.

The RRC_IDLE/RRC_INACTIVE UE may camp on a cell. The RRC_CONNECTED UE may be served by a (serving) cell. The proposed design(s) may be applicable for RRC_IDLE/RRC_INACTIVE/RRC_CONNECTED UE(s).

The White List(s) may be intra-frequency White List, inter-frequency White List, inter-RAT intra-frequency White List, and inter-RAT inter-frequency White List.

The inter-RAT cell (re)selection may be inter-RAT intra-frequency cell (re)selection and inter-RAT inter-frequency cell (re)selection.

The RAT may be (but not limited to) NR, LTE, E-UTRA connected to 5GC, LTE connected to 5GC, E-UTRA connected to EPC, and LTE connected to EPC.

A suitable cell is a cell on which a UE may camp. The UE (e.g., especially not in an SNPN access mode) may consider a cell as suitable if the following conditions are fulfilled: (1) The cell is part of either the selected PLMN or the R-PLMN or PLMN of the E-PLMN list, and (2) The cell selection criteria (e.g., S criteria) of the cell are fulfilled. Furthermore, according to the latest information provided by the NAS of the UE, the suitable cell is not barred. The suitable cell is part of at least one TA that is not part of the list of "Forbidden Tracking Areas," which belongs to a PLMN that fulfills the condition (1). The UE (e.g., especially in SNPN access mode, especially registering/selecting an NPN) may consider a cell as a suitable cell if the following conditions are fulfilled: (1) The cell is part of either the selected NPN (e.g., an SNPN) or the registered NPN (e.g., an SNPN) or NPN (e.g., an SNPN) of the E-NPN (e.g., an equivalent SNPN) list, and (2) The cell selection criteria (e.g., S criteria) of the cell are fulfilled. Furthermore, according to the latest information provided by the NAS of the UE, the suitable cell is not barred. The suitable cell is part of at least one TA that is not part of the list of "Forbidden Tracking Areas," which belongs to an NPN (e.g., SNPN) that fulfills the condition (1).

The proposed mechanism may be used for licensed frequency and/or unlicensed frequency.

The UE may be served by a cell, e.g., serving cell. The serving cell may serve (but not limited to) an RRC_CONNECTED UE. The serving cell may be (but not limited to) a suitable cell.

The UE may camp on a cell, e.g., camped cell. The camped cell may be a suitable cell or an acceptable cell.

An acceptable cell is a cell on which the UE may camp to obtain limited service (e.g., originate emergency calls and receive Earthquake and Tsunami Warning System (ETWS) and Commercial Mobile Alert System (CMAS) notifications). Such a cell may fulfill the following requirements, which is the minimum set of requirements to initiate an emergency call and to receive ETWS and CMAS notification in an NR network: (1) the cell is not barred, and/or (2) the cell selection criteria are fulfilled.

The cells (e.g., indicated by PLMN information, area information, NPN information, and/or frequency information) provided by the White List(s) may be the neighboring cells for the UE which receives the White List(s).

The White List(s) that the UE receives via dedicated signaling may refer to the "UE-specific" White List(s). The White List(s) that the UE receives via system information may refer to the "cell-specific" White List(s). The White List(s) configured to an RRC_INACTIVE UE may refer to Inactive-state-specific White List(s). The Inactive-state-specific White List(s) may be a kind of "UE-specific" White List(s), or a kind of "cell-specific" White List(s). The White List(s) configured to an RRC_IDLE UE may refer to Idle-state-specific White List(s). The Idle-state-specific White List(s) may be a kind of "UE-specific" White List(s), or a kind of "cell-specific" White List(s).

FIG. 1 illustrates a flowchart for a method for cell (re)selection, in accordance with an implementation of the present disclosure. It should be noted that although actions 102, 104, 106, 108, and 110 are illustrated as separate actions represented as independent blocks in FIG. 1, these separately delineated actions should not be construed as necessarily order dependent. The order in which the actions are performed in FIG. 1 is not intended to be construed as a limitation, and any number of the disclosed blocks may be combined in any order to implement the method, or an alternate method. Moreover, one or more of the actions 102, 104, 106, 108, and 110 may be omitted in some of the present implementations.

In action 102, a UE may store allowed NPN information that is in a form of a CAG ID list or in a form of a SNPN ID list. The allowed NPN information may be received by the UE from a network or already stored at the UE before the UE connects to the network or preconfigured in the UE (e.g., by the NAS of the UE). In one implementation, the allowed NPN information may be (or may be included or may be associated with) a White List(s) in the various implementations of the present disclosure. The terms "allowed NPN information" and "White List(s)" may be interchangeably utilized in some implementations of the present disclosure.

In action 104, the UE may receive NPN information and area information associated with the NPN information via a SIB1 broadcast by a cell. The NPN information may include an NPN ID list. The area information may include at least one of a TAC, a cell ID, a RAN Area ID and an RANAC. For example, the NPN ID list may include an NPN ID #1 that indicates an NPN #1 (a PNI-NPN or an SNPN) and an NPN ID #2 that indicates an NPN #2 (a PNI-NPN or an SNPN). In this case, the area information may include the TAC, cell ID, RAN Area ID and/or RANAC of the NPN #1 and the TAC, cell ID, RAN Area ID and/or RANAC of the NPN #2.

In one implementation, the maximum number of NPN IDs in the NPN ID list may be configured by the cell as 12.

In action 106, the UE may determine that the allowed NPN information is in the form of the CAG ID list.

In action 108, when the allowed NPN information is in the form of the CAG ID list, the UE may perform a first procedure according to the allowed NPN information.

In action 110, when the allowed NPN information is in the form of the SNPN ID list, the UE may perform a second procedure according to the allowed NPN information.

Examples of the first procedure and second procedure are described with reference to FIGS. 2-5.

It should be noted that action 106 may be omitted in some implementations of the present disclosure. The UE may inherently know the allowed NPN information is in the form of the CAG ID list or the SNPN ID list according to its current operation mode, where the operation mode may be determined by the NAS of the UE. Depending on which form of the allowed NPN information is, the UE may perform action 108 or 110 accordingly.

Figure 2:
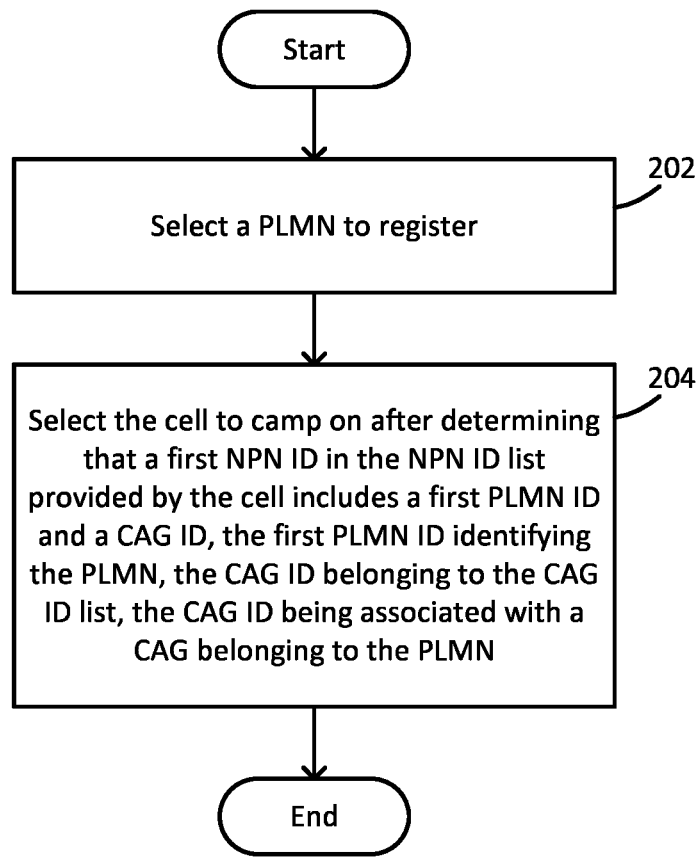
FIG. 2 illustrates a flowchart for a first procedure in accordance with an implementation of the present disclosure.

FIG. 2 illustrates a flowchart for a first procedure in accordance with an implementation of the present disclosure.

As illustrated in FIG. 2, in action 202, the UE may select a PLMN to register.

In action 204, the UE may select the cell (e.g., the cell broadcasting the NPN information, as described in action 104 of FIG. 1) to camp on (and/or regard the cell as a candidate cell for the cell (re)selection procedure) after determining that a first NPN ID in the NPN ID list provided by the cell includes a first PLMN ID and a CAG ID. The first PLMN ID may identify the PLMN selected to register. The CAG ID may belong to the CAG ID list. The CAG ID may be associated with a CAG belonging to the PLMN. Overall, the first NPN ID indicates a PNI-NPN deployed with a support of the PLMN (the UE selects to register).

Figure 3:
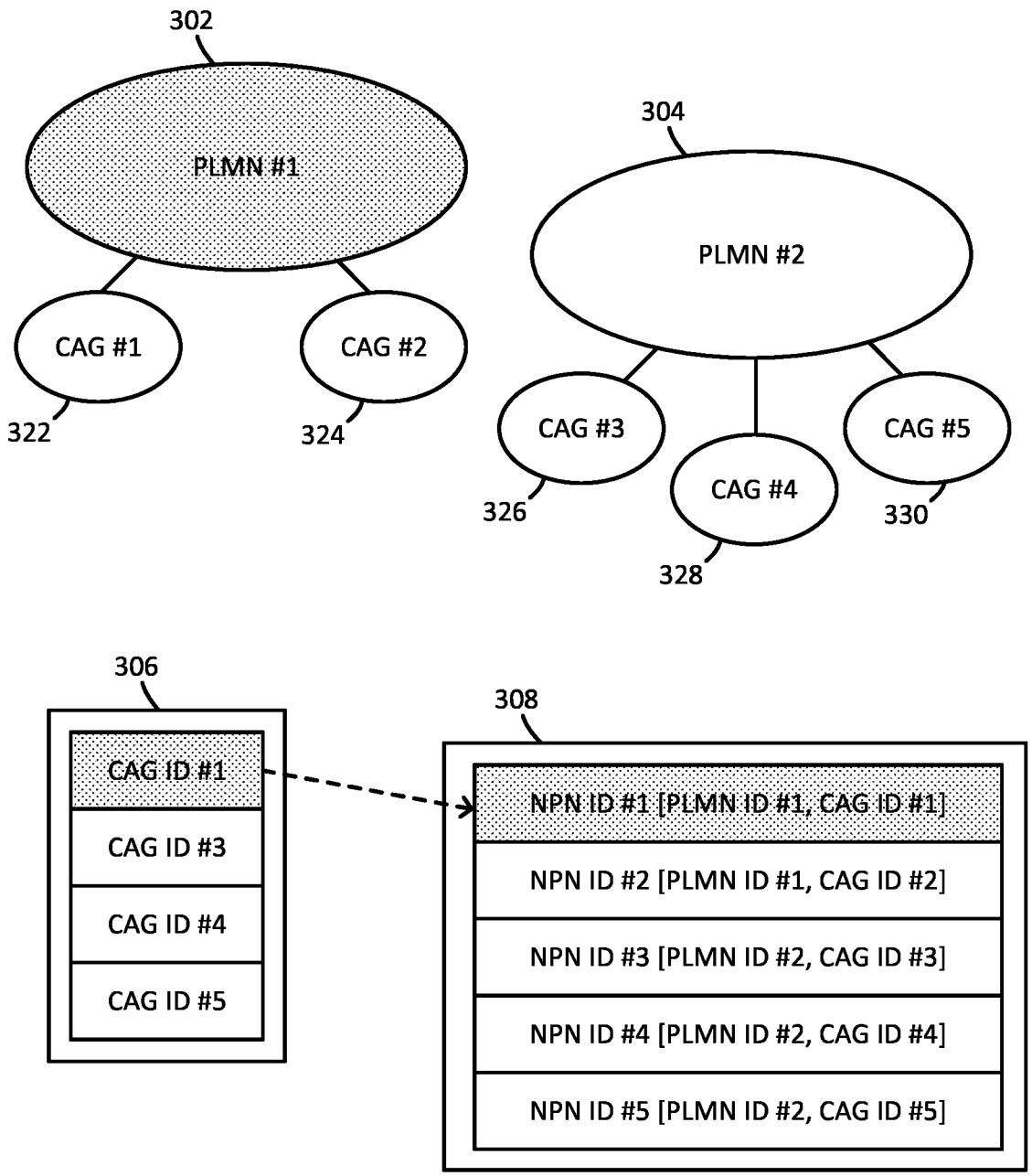
FIG. 3 is a schematic diagram illustrating a process of selecting an NPN ID from an NPN ID list based on the allowed NPN information that is in the form of a CAG ID list, in accordance with an implementation of the present disclosure.

FIG. 3 is a schematic diagram illustrating a process of selecting an NPN ID from an NPN ID list based on the allowed NPN information that is in the form of a CAG ID list in accordance with an implementation of the present disclosure.

A UE may perform PLMN selection to determine which PLMN to register based on certain PLMN selection criteria. For example, rather than selecting PLMN #2 304 (e.g., indicated by PLMN ID #2), the UE may select PLMN #1 302 (e.g., indicated by PLMN ID #1) to register because PLMN #1 302 is the PLMN that matches the PLMN related information in Universal Subscriber Identity Module (USIM) of the UE and/or meets the requirement(s) of the NAS of the UE while PLMN #2 304 does not. Besides, a PLMN may have one or more CAGs. As illustrated in FIG. 3, PLMN #1 302 may include CAG #1 322 and CAG #2 324; PLMN #2 304 may include CAG #3 326, CAG #4 328, and CAG #5 330.

In the implementation illustrated in FIG. 3, the allowed NPN information that is already stored at the UE may be a CAG ID list (e.g., CAG ID list 306) that includes a set of CAG IDs (e.g., CAG ID #1, CAG ID #3, CAG ID #4, and CAG ID #5). Each CAG ID may identify a CAG. For example, CAG ID #1 may identify CAG #1 322, CAG ID #2 may identify CAG #2 324, CAG ID #3 may identify CAG #3 326, CAG ID #4 may identify CAG #4 328, and CAG ID #5 may identify CAG #5 330.

It should be noted that even if in the implementation illustrated in FIG. 3, multiple CAG IDs and NPN IDs are included in the CAG ID list and the NPN ID list, respectively, the CAG ID list may include one or more CAG IDs, and the NPN ID list may include one or more NPN IDs in some other implementations of the present disclosure.

The UE may receive NPN information from a cell via SIB1. The NPN information may include an NPN ID list (e.g., NPN ID list 308) that contains a set of NPN IDs (e.g., NPN ID #1, NPN ID #2, NPN ID #3, NPN ID #4, and NPN ID #5, as illustrated in FIG. 3). In the present implementation, each NPN ID in the NPN ID list may be a PNI-NPN ID that identifies a PNI-NPN. A PNI-NPN ID may include a PLMN ID portion and a CAG ID portion. The PLMN ID portion may contain a PLMN ID. The CAG ID portion may contain a CAG ID. As illustrated in FIG. 3, NPN ID #1 includes PLNM ID #1 and CAG ID #1; NPN ID #2 includes PLNM ID #1 and CAG ID #2; NPN ID #3 includes PLNM ID #2 and CAG ID #3; NPN ID #4 includes PLNM ID #2 and CAG ID #4; NPN ID #5 includes PLNM ID #2 and CAG ID #5.

The UE may determine whether the cell that transmits the NPN information is suitable to camp on (and/or regard the cell as a candidate cell for the cell (re)selection procedure) by comparing the allowed NPN information and the NPN information. For example, after selecting PLMN #1 302 to register, the UE may filter out all NPN IDs (e.g., NPN ID #3, NPN ID #4, and NPN ID #5) not including PLMN ID #1 (identifying PLMN #1 302) from NPN ID list 308, and select an NPN ID (e.g., NPN ID #1) that includes the CAG ID (e.g., CAG ID #1) belonging to CAG ID list 306 from a remaining portion of NPN ID list 308 (e.g., NPN ID #1 and NPN ID #2, which are remained in NPN ID list 308 after the filtering). The selected NPN ID may be considered as the first NPN ID described in action 204 of FIG. 2.

Figure 4:
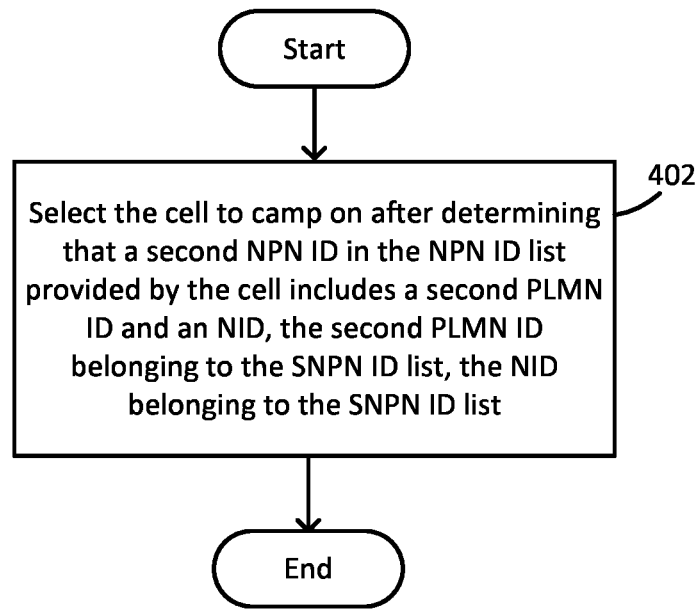
FIG. 4 illustrates a flowchart for a second procedure in accordance with an implementation of the present disclosure.

FIG. 4 illustrates a flowchart for a second procedure in accordance with an implementation of the present disclosure.

As illustrated in FIG. 4, in action 402, the UE may select the cell (e.g., the cell broadcasting the NPN information, as described in action 104 of FIG. 1) to camp on (and/or regard the cell as a candidate cell for the cell (re)selection procedure) after determining that a second NPN ID in the NPN ID list provided by the cell includes a second PLMN ID and an NID. The second PLMN ID may belong to the SNPN ID list. The NID may belong to the SNPN ID list. The second NPN ID (e.g., an SNPN ID) may indicate an SNPN.

Each SNPN ID in the SNPN ID list may include a PLMN ID portion and an NID portion. The second NPN ID may be considered as including the second PLMN ID and the NID if the second PLMN ID in the second NPN ID matches the PLMN ID portion of an SNPN ID in the SNPN ID list, and the NID in the second NPN ID matches the NID portion of the SNPN ID in the SNPN ID list.

Figure 5:
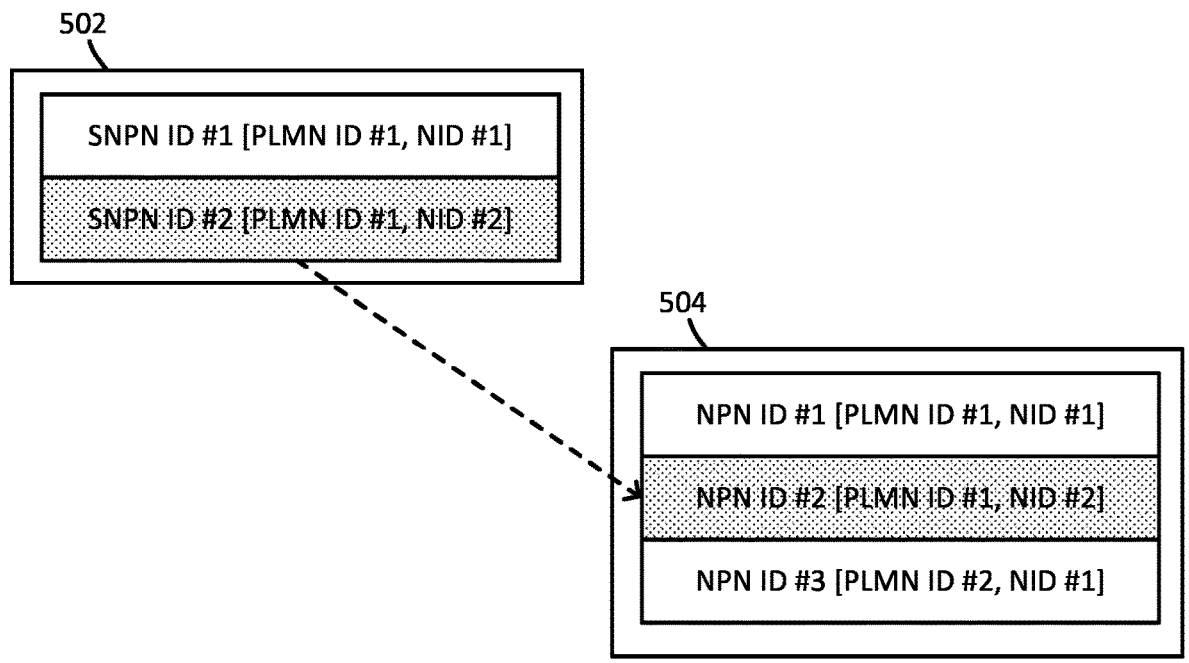
FIG. 5 is a schematic diagram illustrating a process of selecting an NPN ID from an NPN ID list based on the allowed NPN information that is in the form of an SNPN ID list, in accordance with an implementation of the present disclosure.

FIG. 5 is a schematic diagram illustrating a process of selecting an NPN ID from an NPN ID list based on the allowed NPN information that is in the form of an SNPN ID list in accordance with an implementation of the present disclosure.

In the implementation illustrated in FIG. 5, the allowed NPN information that is already stored at the UE may be an SNPN ID list (e.g., SNPN ID list 502) that includes a set of SNPN IDs (e.g., SNPN ID #1 and SNPN ID #2). As described above, each SNPN ID in the SNPN ID list may include a PLMN ID portion and an NID portion. For example, in SNPN ID list 502, SNPN ID #1 includes PLMN ID #1 and NID #1; SNPN ID #2 includes PLMN ID #1 and NID #2.

The UE may receive NPN information from a cell via SIB1. The NPN information may include an NPN ID list (e.g., NPN ID list 504) that contains a set of NPN IDs (e.g., NPN ID #1, NPN ID #2, and NPN ID #3). In the present implementation, each NPN ID in the NPN ID list may be an SNPN ID. As illustrated in FIG. 5, in NPN ID list 504, NPN ID #1 includes PLMN ID #1 and NID #1; NPN ID #2 includes PLMN ID #1 and NID #2; NPN ID #3 includes PLMN ID #2 and NID #1.

It should be noted that even if in the implementation illustrated in FIG. 5, multiple SNPN IDs and NPN IDs are included in the SNPN ID list and the NPN ID list, respectively, the SNPN ID list may include one or more SNPN IDs and the NPN ID list may include one or more NPN IDs in some other implementations of the present disclosure.

The UE may determine whether the cell that transmits the NPN information is suitable to camp on (and/or regard the cell as a candidate cell for the cell (re)selection procedure) by comparing the allowed NPN information and the NPN information. If one of the SNPN ID(s) contained in the allowed NPN information matches an NPN ID (or SNPN ID) contained in the NPN ID list from the cell, the UE may select the cell to camp on (and/or regard the cell as a candidate cell for the cell (re)selection procedure). Otherwise, the UE may consider the cell is not suitable to camp on (and/or is not to regard the cell as a candidate cell for the cell (re)selection procedure). In one implementation, the UE may filter out all NPN IDs (e.g., NPN ID #1 and NPN ID #3 in NPN ID list 504) not including a second PLMN ID and an NID contained in the SNPN ID list (e.g., SNPN ID #2 containing PLMN ID #1 and NID #2 in SNPN ID list 502) from the NPN ID list (e.g., NPN ID list 504), and select an NPN ID (e.g., NPN ID #2) that includes the second PLMN ID and the NID from a remaining portion of the NPN ID list. The selected NPN ID may be considered as the second NPN ID described in action 402 of FIG. 4.

In one implementation, the area information associated with the NPN information from the cell may include first area information and second area information. The first area information may be associated with the first NPN ID. The second area information may be associated with the second NPN ID. For example, the first area information may include the TAC, cell ID, RAN Area ID and/or RANAC of the PNI-NPN indicated by the first NPN ID, and the second area information may include the TAC, cell ID, RAN Area ID and/or RANAC of the SNPN indicated by the second NPN ID.

Figure 6:
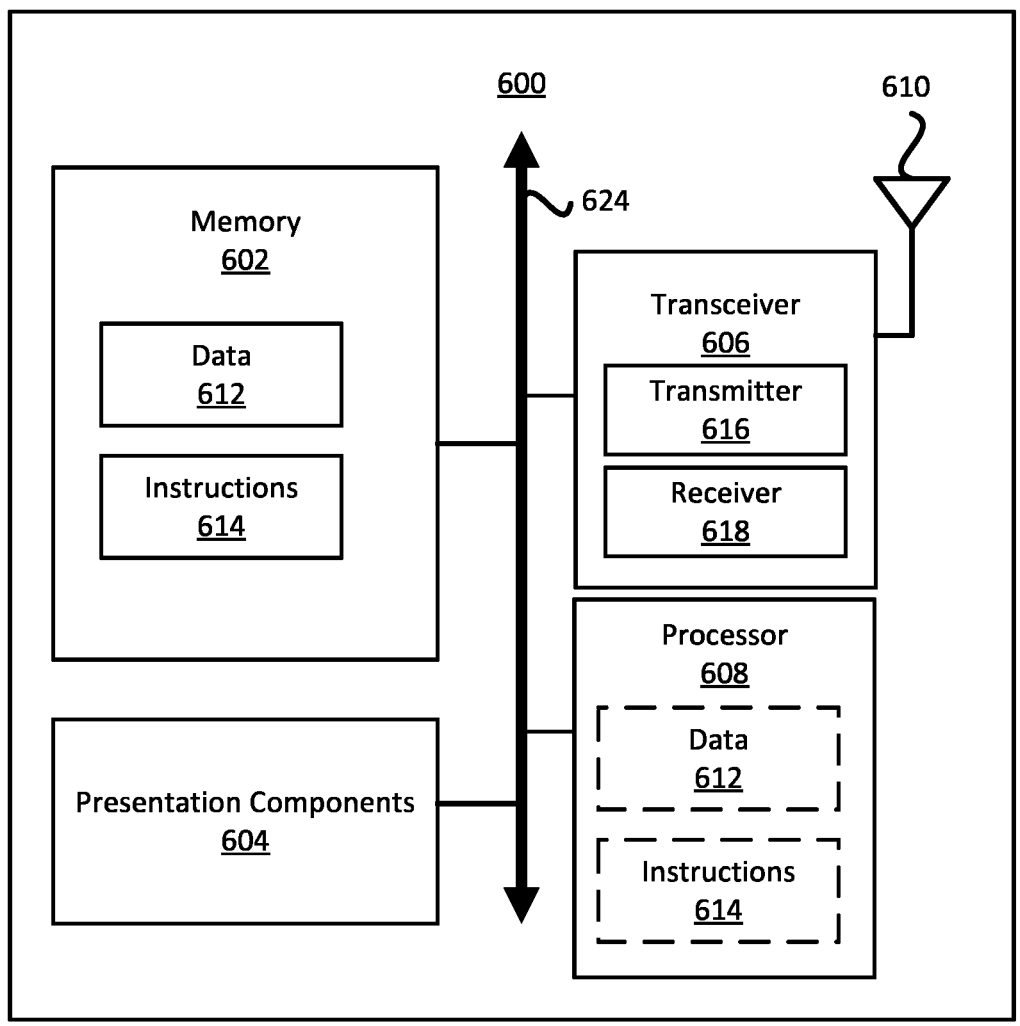
FIG. 6 illustrates a block diagram of a node for wireless communication, in accordance with various aspects of the present disclosure.

FIG. 6 illustrates a block diagram of a node 600 for wireless communication, in accordance with various aspects of the present disclosure. As illustrated in FIG. 6, the node 600 may include a transceiver 606, a processor 608, a memory 602, one or more presentation components 604, and at least one antenna 610. The node 600 may also include an RF spectrum band module, a BS communications module, a network communications module, and a system communications management module, Input/Output (I/O) ports, I/O components, and a power supply (not explicitly illustrated in FIG. 6). Each of these components may be in communication with each other, directly or indirectly, over one or more buses 624. In one implementation, the node 600 may be a UE or a BS that performs various functions described herein, for example, with reference to FIGS. 1 through 5.

The transceiver 606 having a transmitter 616 (e.g., transmitting/transmission circuitry) and a receiver 618 (e.g., receiving/reception circuitry) may be configured to transmit and/or receive time and/or frequency resource partitioning information. In one implementation, the transceiver 606 may be configured to transmit in different types of subframes and slots, including, but not limited to, usable, non-usable and flexibly usable subframes and slot formats. The transceiver 606 may be configured to receive data and control channels.

The node 600 may include a variety of computer-readable media. Computer-readable media can be any available media that can be accessed by the node 600 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media may not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 602 may include computer storage media in the form of volatile and/or non-volatile memory. The memory 602 may be removable, non-removable, or a combination thereof. For example, the memory 602 may include solid-state memory, hard drives, optical-disc drives, etc. As illustrated in FIG. 6, the memory 602 may store computer-readable and/or computer-executable instructions 614 (e.g., software codes) that are configured to, when executed, cause the processor 608 to perform various functions described herein, for example, with reference to FIGS. 1 through 5. Alternatively, the instructions 614 may not be directly executable by the processor 608 but may be configured to cause the node 600 (e.g., when compiled and executed) to perform various functions described herein.

The processor 608 (e.g., having processing circuitry) may include an intelligent hardware device, a Central Processing Unit (CPU), a microcontroller, an ASIC, etc. The processor 608 may include memory. The processor 608 may process the data 612 and the instructions 614 received from the memory 602, and information through the transceiver 606, the baseband communications module, and/or the network communications module. The processor 608 may also process information to be sent to the transceiver 606 for transmission through the antenna 610, to the network communications module for transmission to a CN.

One or more presentation components 604 may present data indications to a person or other devices. Examples of presentation components 604 may include a display device, a speaker, printing component, a vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a Base Station (BS) for cell selection or reselection, the method comprising:
    transmitting, to a User Equipment (UE), allowed Non-Public Network (NPN) information that is in a form of a Cell Access Group (CAG) Identity (ID) list or in a form of a Stand-alone Non-Public Network (SNPN) ID list; and
    transmitting, to the UE, NPN information and area information associated with the NPN information via a System Information Block (SIB) Type 1 (SIB1), the NPN information comprising an NPN ID list, wherein:
    in a case that the allowed NPN information is in the form of the CAG ID list, the allowed NPN information enables the UE to perform a first procedure;
    in a case that the allowed NPN information is in the form of the SNPN ID list, the allowed NPN information enables the UE to perform a second procedure;
    the first procedure comprises:
    selecting a Public Land Mobile Network (PLMN) to register, and
    selecting a cell to camp on after determining that a first NPN ID in the NPN ID list comprises a first PLMN ID and a CAG ID, the first PLMN ID identifying the PLMN, the CAG ID belonging to the CAG ID list, the CAG ID associated with a CAG belonging to the PLMN; and
    the second procedure comprises:
    selecting the cell to camp on after determining that a second NPN ID in the NPN ID list comprises a second PLMN ID and a Network ID (NID), the second PLMN ID and the NID belonging to the SNPN ID list.

2. The method of claim 1, wherein the area information comprises at least one of a Tracking Area Code (TAC), a cell ID, and a Radio Access Network Area Code (RANAC).

3. The method of claim 1, wherein a maximum number of NPN IDs in the NPN ID list is configured by the cell as 12.

4. The method of claim 1, wherein the first NPN ID indicates a Public Network Integrated NPN (PNI-NPN) deployed with support of the PLMN.

5. The method of claim 1, wherein the second NPN ID indicates an SNPN.

6. The method of claim 1, wherein the first procedure further comprises:
    filtering out all NPN IDs excluding the first PLMN ID from the NPN ID list; and
    selecting an NPN ID that includes the CAG ID belonging to the CAG ID list from a remaining portion of the NPN ID list as the first NPN ID.

7. The method of claim 1, wherein each SNPN ID in the SNPN ID list comprises a PLMN ID portion and an NID portion.

8. The method of claim 7, wherein:
    the second PLMN ID in the second NPN ID matches the PLMN ID portion of an SNPN ID in the SNPN ID list; and
    the NID in the second NPN ID matches the NID portion of the SNPN ID in the SNPN ID list.

9. The method of claim 1, wherein the area information comprises first area information and second area information, the first area information is associated with the first NPN ID, and the second area information is associated with the second NPN ID.

10. The method of claim 1, wherein the second procedure further comprises:
    filtering out all NPN IDs excluding the second PLMN ID and the NID from the NPN ID list; and
    selecting an NPN ID that includes the second PLMN ID and the NID from a remaining portion of the NPN ID list as the second NPN.

11. A Base Station (BS) comprising:
    at least one memory storing a set of instructions; and
    at least one processor coupled to the at least one memory, the at least one processor configured to execute the set of instructions to:
    transmit, to a User Equipment (UE), allowed Non-Public Network (NPN) information that is in a form of a Cell Access Group (CAG) Identity (ID) list or in a form of a Stand-alone Non-Public Network (SNPN) ID list; and
    transmit, to the UE, NPN information and area information associated with the NPN information via a System Information Block (SIB) Type 1 (SIB1), the NPN information comprising an NPN ID list, wherein:
    in a case that the allowed NPN information is in the form of the CAG ID list, the allowed NPN information enables the UE to perform a first procedure;
    in a case that the allowed NPN information is in the form of the SNPN ID list, the allowed NPN information enables the UE to perform a second procedure;
    the first procedure comprises:
    selecting a Public Land Mobile Network (PLMN) to register, and
    selecting a cell to camp on after determining that a first NPN ID in the NPN ID list comprises a first PLMN ID and a CAG ID, the first PLMN ID identifying the PLMN, the CAG ID belonging to the CAG ID list, the CAG ID associated with a CAG belonging to the PLMN; and
    the second procedure comprises:
    selecting the cell to camp on after determining that a second NPN ID in the NPN ID list comprises a second PLMN ID and a Network ID (ND), the second PLMN ID and the ND belonging to the SNPN ID list.

12. The BS of claim 11, wherein the area information comprises at least one of a Tracking Area Code (TAC), a cell ID, and a Radio Access Network Area Code (RANAC).

13. The BS of claim 11, wherein a maximum number of NPN IDs in the NPN ID list is configured by the cell as 12.

14. The BS of claim 11, wherein the first NPN ID indicates a Public Network Integrated NPN (PNI-NPN) deployed with support of the PLMN.

15. The BS of claim 11, wherein the second NPN ID indicates an SNPN.

16. The BS of claim 11, wherein the first procedure further comprises:
   filtering out all NPN IDs excluding the first PLMN ID from the NPN ID list; and
   selecting an NPN ID that includes the CAG ID belonging to the CAG ID list from a remaining portion of the NPN ID list as the first NPN ID.

17. The BS of claim 11, wherein each SNPN ID in the SNPN ID list comprises a PLMN ID portion and an NID portion.

18. The BS of claim 17, wherein:
   the second PLMN ID in the second NPN ID matches the PLMN ID portion of an SNPN ID in the SNPN ID list; and
   the NID in the second NPN ID matches the NID portion of the SNPN ID in the SNPN ID list.

19. The BS of claim 11, wherein the area information comprises first area information and second area information, the first area information is associated with the first NPN ID, and the second area information is associated with the second NPN ID.

20. The BS of claim 11, wherein the second procedure further comprises:
   filtering out all NPN IDs excluding the second PLMN ID and the NID from the NPN ID list; and
   selecting an NPN ID that includes the second PLMN ID and the NID from a remaining portion of the NPN ID list as the second NPN ID.

* * * * *